United States Patent
Liu et al.

(10) Patent No.: US 11,825,248 B2
(45) Date of Patent: Nov. 21, 2023

(54) SPECTRUM ALLOCATION METHOD AND APPARATUS

(71) Applicant: Huawei Technologies Co., Ltd., Shenzhen (CN)

(72) Inventors: Liu Liu, Chengdu (CN); Yufei Wang, Shenzhen (CN); Guangzhi Li, Shenzhen (CN); Guangyi Qiao, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 17/508,432

(22) Filed: Oct. 22, 2021

(65) Prior Publication Data

US 2022/0070559 A1 Mar. 3, 2022

Related U.S. Application Data

(63) Continuation of application No. PCT/CN2020/081814, filed on Mar. 27, 2020.

(30) Foreign Application Priority Data

Apr. 23, 2019 (CN) .......................... 201910338235.4

(51) Int. Cl.
*H04J 14/02* (2006.01)
*H04Q 11/00* (2006.01)

(52) U.S. Cl.
CPC . *H04Q 11/0067* (2013.01); *H04Q 2011/0086* (2013.01)

(58) Field of Classification Search
CPC .................................................. H04J 14/0241
See application file for complete search history.

(56) References Cited

U.S. PATENT DOCUMENTS

| | | | |
|---|---|---|---|
| 2014/0341572 A1* | 11/2014 | Sambo | H04J 14/0267 398/48 |
| 2017/0054506 A1* | 2/2017 | Takeshita | H04J 14/02 |
| 2017/0180073 A1* | 6/2017 | Takeshita | H04B 10/27 |

FOREIGN PATENT DOCUMENTS

| | | |
|---|---|---|
| CN | 102447623 A | 5/2012 |
| CN | 102546435 A | 7/2012 |

(Continued)

OTHER PUBLICATIONS

Al-Tarawneh, L. et al., "Linear Dynamic Adaptation of the BW Granularity Allocation for Elastic Optical OFDM Networks", 2015 International Symposium on Performance Evaluation of Computer and Telecommunication Systems (SPECTS), Society for Modeling and Simulation International, Jul. 26, 2015, 7 pages.

(Continued)

*Primary Examiner* — Shi K Li
(74) *Attorney, Agent, or Firm* — Slater Matsil, LLP

(57) ABSTRACT

A method includes: obtaining a transmission bandwidth granularity G1 of a target service and an optical-layer spectrum resource of a target fiber channel corresponding to the target service, where the optical-layer spectrum resource includes N consecutive frequency slots, and all of the N consecutive frequency slots have a same spectrum bandwidth; determining a target spectrum slice from the N frequency slots based on the transmission bandwidth granularity G1, where the target spectrum slice includes N1 consecutive frequency slots, and the target spectrum slice includes at least G1 consecutive idle frequency slots; and allocating the G1 consecutive idle frequency slots included in the target spectrum slice to the target service.

19 Claims, 8 Drawing Sheets

(56) References Cited

FOREIGN PATENT DOCUMENTS

| | | | |
|---|---|---|---|
| CN | 103327501 | A | 9/2013 |
| CN | 103391258 | A | 11/2013 |
| CN | 104836751 | A | 8/2015 |
| CN | 104968053 | A | 10/2015 |
| CN | 104202262 | B | 8/2017 |
| CN | 104836736 | B | 3/2018 |
| CN | 104272620 | B | 5/2018 |
| WO | 2015106262 | A1 | 7/2015 |

OTHER PUBLICATIONS

Chatterjee, B.C. et al., "Routing and Spectrum Allocation in Elastic Optical Networks: A Tutorial", IEEE Communication and Surveys & Tutorials, vol. 17, No. 3, Third Quarter (Jul.-Sep.), 2015, pp. 1776-1800.

Abkenar, S.A. et al., "Study and Analysis of Routing and Spectrum Allocation (RSA) and Routing, Modulation and Spectrum Allocation (RMSA) Algorithms in Elastic Optical Networks (EONs)", Optical Switching and Networking, vol. 23, Aug. 21, 2016, 35 pages.

\* cited by examiner

SPECTRUM ALLOCATION METHOD AND APPARATUS

CROSS-REFERENCE TO RELATED APPLICATIONS

This application is a continuation of International Application No. PCT/CN2020/081814, filed on Mar. 27, 2020, which claims priority to Chinese Patent Application No. 201910338235.4, filed on Apr. 23, 2019. The disclosures of the aforementioned applications are hereby incorporated by reference in their entireties.

TECHNICAL FIELD

This application relates to the field of communications technologies, and in particular, to a spectrum allocation method and apparatus.

BACKGROUND

With the continuous development of communications technologies, as one of current mainstream wired communications technologies, an optical fiber communications technology has advantages such as a large transmission spectrum bandwidth, a large communication capacity, and a strong anti-electromagnetic interference capability, and has an increasingly wide range of application. In an optical network formed based on the optical fiber communications technology, optical fibers are responsible for output transmission between two network nodes. For an optical fiber, an available transmission bandwidth is usually relatively large. Currently, a wavelength division multiplexing manner is mainly used on the optical fiber to improve utilization of the transmission bandwidth of the optical fiber. Specifically, the available transmission bandwidth of the optical fiber is divided into a plurality of sub-channels with a smaller bandwidth capacity, and each sub-channel corresponds to one wavelength. When a plurality of services transmit data through the optical fiber, one or more wavelength channels (namely, spectrum resources within a specific range) are allocated to each service, thereby improving the utilization of the transmission bandwidth of the optical fiber. For example, a flexible grid optical network technology is division of optical-layer spectrum resources implemented based on a wavelength division multiplexing idea.

In the conventional technology, on the premise of the flexible grid optical network technology, a spectrum resource is usually allocated to a service based on a first priority matching principle. In other words, each time a service is received, the entire spectrum range is traversed in a specific sequence to search for a spectrum resource available for the service. Currently, due to inherent hardware limitations of a fiber-optic network, the fiber-optic network needs to strictly follow a "wavelength consistency" principle during data transmission. In other words, when a service requests to transmit data on a fiber channel in the fiber-optic network, a same wavelength needs to be allocated to each optical link on the fiber channel, namely, a same spectrum needs to be allocated on each optical link. Therefore, although spectrum resources are available on all optical links in the fiber-optic network, the spectrum resources available on some optical links cannot be used because the wavelength consistency principle needs to be strictly followed, and spectrum fragments are formed. Currently, because a method for allocating a spectrum resource to a service based on the first priority matching principle is merely allocating a first available spectrum resource found by using the first priority matching principle to the service, and considering whether there is another more proper spectrum resource available for allocation and use, spectrum fragments are easily generated when spectrums are allocated to a plurality of services with different transmission bandwidth requirements. As a result, a waste of spectrum resources of the fiber-optic network is caused, and a throughput of the fiber-optic network is reduced.

SUMMARY

Embodiments of this application provide a spectrum allocation method and apparatus, to reduce a spectrum fragmentation rate of a fiber-optic network, and improve spectrum resource utilization and a throughput of the fiber-optic network.

According to a first aspect, an embodiment of this application provides a spectrum allocation method. First, a transmission bandwidth granularity G1 of a target service and an optical-layer spectrum resource of a target fiber channel corresponding to the target service are obtained. Herein, the optical-layer spectrum resource includes N consecutive frequency slots. Then, a target spectrum slice is determined from the N frequency slots based on the transmission bandwidth granularity G1. Herein, the target spectrum slice includes N1 consecutive frequency slots, and the target spectrum slice includes at least G1 consecutive idle frequency slots. Finally, the G1 consecutive idle frequency slots included in the target spectrum slice are allocated to the target service.

In this embodiment of this application, after the transmission bandwidth granularity G1 of the target service and the N frequency slots corresponding to the target service are obtained, the target spectrum slice corresponding to the target service is found or generated in the N frequency slots based on the transmission bandwidth granularity G1 of the target service, and then, a spectrum resource is allocated to the target service by using spectrum slices as a basic range. One service corresponds to one spectrum slice. In this way, spectrum fragments generated during interleaved allocation of spectrum resources to services with different transmission bandwidth granularities can be reduced, so that a spectrum resource allocation process becomes more proper, spectrum resource utilization of the fiber-optic network is improved, and a throughput of the fiber-optic network is also improved.

In a feasible implementation, if N2 consecutive idle frequency slots are found in the N consecutive frequency slots, the N2 consecutive idle frequency slots are determined as the target spectrum slice. Herein, N2 is an integer multiple of the transmission bandwidth granularity G1, and N2 is less than N.

In a feasible implementation, if any type-1 spectrum slice including G1 consecutive idle frequency slots is found in the N frequency slots, the any type-1 spectrum slice including the G1 consecutive idle frequency slots is determined as the target spectrum slice. Herein, a quantity N2 of frequency slots included in the type-1 spectrum slice is an integer multiple of the transmission bandwidth granularity G1. If no type-1 spectrum slice including G1 consecutive idle frequency slots is found in the N frequency slots, the N frequency slots are searched for a type-2 spectrum slice. If any type-2 spectrum slice including G1 consecutive idle frequency slots is found, the any type-2 spectrum slice including the G1 consecutive idle frequency slots is determined as the target spectrum slice. Herein, the type-2 spectrum slice includes a type-A spectrum slice and/or a type-B spectrum slice, a quantity N3 of frequency slots included in the type-B spectrum slice is an integer multiple of a transmission bandwidth granularity G2, and G2 is not equal to G1. Quantities/a quantity of frequency slots included in the type-A spectrum slice include/includes N2 and/or N3, and the type-A spectrum slice may be occupied by at least two types of services with different transmission bandwidth granularities. In other words, if one or more type-1 spectrum slices are found in the N frequency slots, and it is detected that any of the one or more type-1 spectrum slices includes G1 consecutive idle frequency slots, the any type-1 spectrum slice is determined as the target spectrum slice. If no type-1 spectrum slice is found in the N frequency slots, or none of the one or more found type-1 spectrum slices includes G1 consecutive idle frequency slots, the N frequency slots are searched for the type-2 spectrum slice. If any of one or more found type-2 spectrum slices includes G1 consecutive idle frequency slots, the any type-2 spectrum slice is determined as the target spectrum slice. A spectrum resource available for the target service is more likely to exist in the type-1 spectrum slice associated with the transmission bandwidth granularity G1 of the target service, and allocating the spectrum resource to the target service in the type-1 spectrum slice can effectively avoid generation of spectrum fragments. Therefore, the type-1 spectrum slice is preferentially searched for a spectrum resource required by the target service, so that a spectrum allocation rate can be increased, a spectrum fragmentation rate of the fiber-optic network can be reduced, and spectrum utilization of the fiber-optic network can be improved.

In a feasible implementation, when the type-2 spectrum slice includes the type-A spectrum slice and the type-B spectrum slice, if any of one or more type-A spectrum slices found in the N consecutive frequency slots includes G1 consecutive idle frequency slots, the any type-A spectrum slice is determined as the target spectrum slice. If no type-A spectrum slice is found in the N consecutive frequency slots, or none of the one or more found type-A spectrum slices includes G1 consecutive idle frequency slots, the N consecutive frequency slots are searched for the type-B spectrum slice. If any of one or more found type-B spectrum slices includes G1 consecutive idle frequency slots, the any type-B spectrum slice is determined as the target spectrum slice. In a search manner combining the type-A spectrum slice and the type-B spectrum slice, a network device can have a higher probability of determining the target spectrum slice from the N consecutive frequency slots, thereby improving spectrum resource allocation efficiency. In addition, in this manner, a spectrum having idle spectrum resources can be properly utilized in a spectrum allocation process, thereby improving spectrum resource utilization of the fiber-optic network.

In a feasible implementation, if no type-B spectrum slice is found in the N consecutive frequency slots, or none of the one or more found type-B spectrum slices includes G1 consecutive idle frequency slots, when N2 consecutive idle frequency slots are found in the N consecutive frequency slots, the N2 consecutive idle frequency slots are determined as the target spectrum slice.

In a feasible implementation, when the type-2 spectrum slice includes the type-A spectrum slice and the type-B spectrum slice, if any of the one or more type-A spectrum slices found in the N consecutive frequency slots includes G1 consecutive idle frequency slots, the any type-A spectrum slice is determined as the target spectrum slice. When no type-A spectrum slice is found in the N consecutive frequency slots, or none of the one or more found type-A spectrum slices includes G1 consecutive idle frequency slots, the N consecutive frequency slots are searched for the type-B spectrum slice. When M1 type-B spectrum slices are found, and M2 target type-B spectrum slices are determined in the M1 found type-B spectrum slices, the target spectrum slice is determined from the M2 target type-B spectrum slices based on spectrum occupation information of the target type-B spectrum slices. Herein, the target type-B spectrum slice is a type-B spectrum slice including G1 consecutive idle frequency slots, the target fiber channel includes L optical links, and spectrum occupation information of any target type-B spectrum slice is used to represent occupation statuses of all frequency slots included in the any target type-B spectrum slice on all of the L optical links.

In a feasible implementation, the M1 target type-B spectrum slices include a first target type-B spectrum slice and a second target type-B spectrum slice. First, first spectrum occupation information corresponding to the first target type-B spectrum slice and second spectrum occupation information corresponding to the second target type-B spectrum slice are obtained. A first fragmentation rate corresponding to the first target type-B spectrum slice is calculated based on the transmission bandwidth granularity G1 and the first spectrum occupation information, and a second fragmentation rate corresponding to the second target type-B spectrum slice is calculated based on the transmission bandwidth granularity G1 and the second spectrum occupation information. Herein, any fragmentation rate is used to represent a quantity of spectrum fragments included in the any target type-B spectrum slice. If it is determined that the first fragmentation rate is greater than or equal to the second fragmentation rate, the second target type-B spectrum slice is determined as the target spectrum slice; or if it is determined that the first fragmentation rate is less than the second fragmentation rate, the first target type-B spectrum slice is determined as the target spectrum slice. A plurality of target type-B spectrum slices in the N frequency slots are found in advance, and then the target type-B spectrum slice with a minimum fragmentation rate is selected as the target spectrum slice, so that a fragment quantity of the determined target spectrum slice is small, and a fragmentation rate of the optical-layer spectrum resource can be further reduced, thereby improving spectrum resource utilization of the fiber-optic network.

In a feasible implementation, an average value of utilization of all frequency slots in the first target type-B spectrum slice on the optical links is calculated based on the first spectrum occupation information. If it is determined that the average value is greater than or equal to a preset average-value threshold, the first fragmentation rate is determined to be null. If it is determined that the average value is less than the preset average-value threshold, a total fragment quantity of the first target type-B spectrum slice on the target fiber channel is counted based on the first spectrum occupation information. When it is determined that a ratio of the total fragment quantity of the first target type-B spectrum slice on the target fiber channel to a quantity of frequency slots included in the first target type-B spectrum slice is greater than or equal to a preset ratio threshold, the ratio is determined as the first fragmentation rate corresponding to the first slice. When it is determined that the ratio is less than the preset ratio threshold, the first fragmentation rate is determined to be null.

In a feasible implementation, the following operations are performed on the first target type-B spectrum slice on any optical link 1 in the optical links in the target fiber channel based on the first spectrum occupation information: determining, based on an occupation status that is of the first target type-B spectrum slice on the optical link 1 and that is included in the first spectrum occupation information, one or more frequency slot blocks that are in the first target type-B spectrum slice and that are not occupied by the optical link i; and counting a quantity of target frequency slot blocks included in the one or more frequency slot blocks, and determining the quantity of target frequency slot blocks as a fragment quantity of the first target type-B spectrum slice on the optical link 1. Herein, a quantity of frequency slots included in the target frequency slot block is less than the transmission bandwidth granularity G1.

The total fragment quantity of the first target type-B spectrum slice on the target fiber channel is determined based on fragment quantities of the first target type-B spectrum slice on the optical links.

In a feasible implementation, an average value of utilization of all frequency slots in the second target type-B spectrum slice on the optical links is calculated based on the second spectrum occupation information. If it is determined that the average value is greater than or equal to a preset average-value threshold, the second fragmentation rate is determined to be null. If it is determined that the average value is less than the preset average-value threshold, a total fragment quantity of the second target type-B spectrum slice on the target fiber channel is counted based on the second spectrum occupation information. When it is determined that a ratio of the total fragment quantity of the second target type-B spectrum slice on the target fiber channel to a quantity of frequency slots included in the second target type-B spectrum slice is greater than or equal to a preset ratio threshold, the ratio is determined as the second fragmentation rate corresponding to the second slice. When it is determined that the ratio is less than the preset ratio threshold, the second fragmentation rate is determined to be null.

In a feasible implementation, the following operations are performed on the first target type-B spectrum slice on any optical link 1 in the optical links in the target fiber channel based on the second spectrum occupation information: determining, based on an occupation status that is of the second target type-B spectrum slice on the optical link 1 and that is included in the second spectrum occupation information, one or more frequency slot blocks that are in the second target type-B spectrum slice and that are not occupied by the optical link i; counting a quantity of target frequency slot blocks included in the one or more frequency slot blocks, and determining the quantity of target frequency slot blocks as a fragment quantity of the second target type-B spectrum slice on the optical link 1, where a quantity of frequency slots included in the target frequency slot block is less than the transmission bandwidth granularity G1, and determining the total fragment quantity of the second target type-B spectrum slice on the target fiber channel based on fragment quantities of the second target type-B spectrum slice on the optical links.

In a feasible implementation, when the type-2 spectrum slice includes the type-A spectrum slice and the type-B spectrum slice, if any of the one or more type-A spectrum slices found in the N consecutive frequency slots includes G1 consecutive idle frequency slots, the any type-A spectrum slice is determined as the target spectrum slice. When no type-A spectrum slice is found in the N consecutive frequency slots, or none of the one or more found type-A spectrum slices includes G1 consecutive idle frequency slots, spectrum occupation information corresponding to the N consecutive frequency slots is obtained; and plane utilization of the N consecutive frequency slots is determined based on the spectrum occupation information. Herein, the target fiber channel includes L optical links, the spectrum occupation information is used to indicate an occupation status of each of the N frequency slots on each of the L optical links, and the plane utilization is a ratio of idle frequency slots to occupied frequency slots in the N consecutive frequency slots. If the plane utilization is greater than a preset plane utilization threshold, the N consecutive frequency slots are searched for the type-B spectrum slice, and if any of the one or more found type-B spectrum slices includes G1 consecutive idle frequency slots, the any type-B spectrum slice is determined as the target spectrum slice. If no type-B spectrum slice including G1 consecutive idle frequency slots is found, when N2 consecutive idle frequency slots are found in the N consecutive frequency slots, the N2 consecutive idle frequency slots are determined as the target spectrum slice.

In a feasible implementation, if the plane utilization is less than or equal to the preset plane utilization threshold, the N consecutive frequency slots are searched for N2 consecutive idle frequency slots, and when the N2 consecutive idle frequency slots are found in the N consecutive frequency slots, the N2 consecutive idle frequency slots are determined as the target spectrum slice. When the N2 consecutive idle frequency slots are not found in the N consecutive frequency slots, the N consecutive frequency slots are searched for the type-B spectrum slice. If any of the one or more found type-B spectrum slices includes G1 consecutive idle frequency slots, the any type-B spectrum slice is determined as the target spectrum slice.

According to a second aspect, an embodiment of this application provides a spectrum allocation apparatus. The apparatus includes units configured to perform the spectrum allocation method provided in any possible implementation of the first aspect, and therefore can implement beneficial effects (or advantages) of the spectrum allocation method provided in the first aspect.

According to a third aspect, an embodiment of this application provides an electronic device. The electronic device includes a processor and a memory, and the processor and the memory are connected to each other. The memory is configured to store a computer program, the computer program includes program instructions, and the processor is configured to invoke the program instructions to execute the spectrum allocation method provided in the first aspect, to implement beneficial effects of the spectrum allocation method provided in the first aspect.

According to a fourth aspect, an embodiment of this application provides a computer readable storage medium. The computer readable storage medium stores instructions. When the instructions are run on a computer, the computer is enabled to perform the spectrum allocation method provided in any possible implementation of the first aspect, to implement beneficial effects of the spectrum allocation method provided in the first aspect.

According to a fifth aspect, an embodiment of this application provides a computer program product including instructions. When the computer program product is run on a computer, the computer is enabled to perform the spectrum allocation method provided in the first aspect, to implement beneficial effects of the spectrum allocation method provided in the first aspect.

By implementing the embodiments of this application, a spectrum fragmentation rate of the fiber-optic network can be reduced, and spectrum resource utilization and a throughput of the fiber-optic network can be improved.

DETAILED DESCRIPTION OF ILLUSTRATIVE EMBODIMENTS

The following describes the technical solutions in the embodiments of this application with reference to the accompanying drawings in the embodiments of this application.

To facilitate understanding of the technical solutions of this application, the following first briefly describes a structure of a fiber-optic network and a process of allocating a spectrum to a service in the fiber-optic network.

Figure 1:
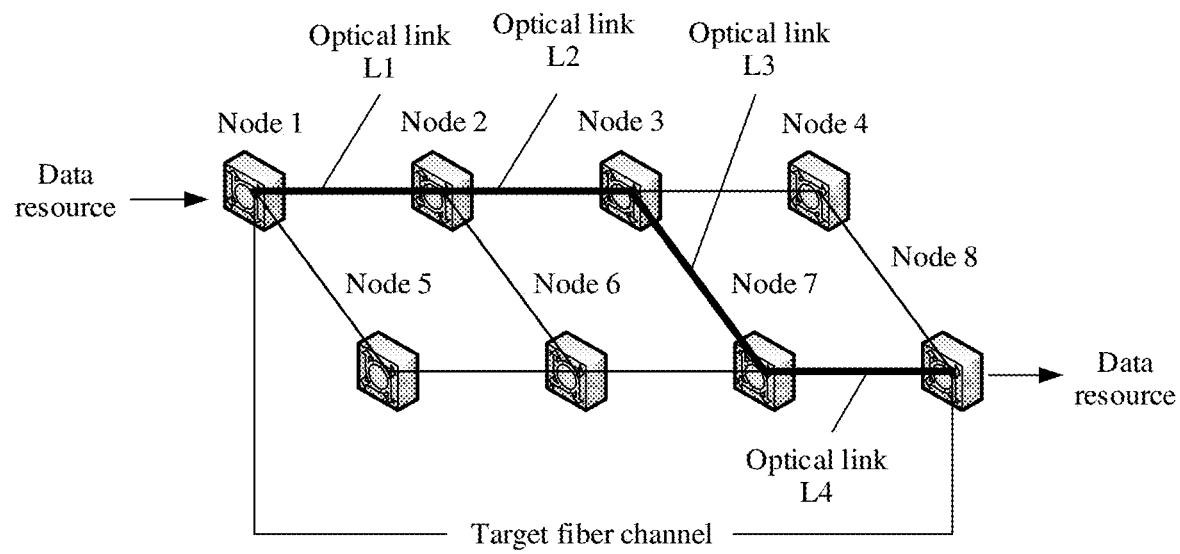
FIG. 1 is a schematic structural diagram of a fiber-optic network according to an embodiment of this application.

The fiber-optic network uses an optical wave to transmit, in an optical waveguide fiber (referred to as an optical fiber), a data resource requested to be transmitted by a service accessed by the fiber-optic network. Referring to FIG. 1, FIG. 1 is a schematic structural diagram of a fiber-optic network according to an embodiment of this application. The fiber-optic network shown in FIG. 1 includes eight network nodes, such as a node 1, a node 2, a node 3, a node 4, a node 5, a node 6, a node 7, and a node 8. A channel between each node is referred to as an optical link, for example, an optical link L1, an optical link L2, an optical link L3, and an optical link L4 shown in FIG. 1. After the fiber-optic network accesses one service, a network device related to the fiber-optic network first allocates one or more fiber channels available for data resource transmission to the service, for example, a fiber channel L formed by the optical link L1, the optical link L2, the optical link L3, and the optical link L4 in FIG. 1. Herein, the network device may be specifically a path computation element (PCE) a controller module or the like in the fiber-optic network. This is not limited herein. After allocating a fiber channel to a service, the network device needs to allocate an available spectrum resource to the service, for each optical link in the fiber channel corresponding to the service to use. In actual application, due to inherent hardware limitations of the fiber-optic network, the fiber-optic network needs to strictly follow a "wavelength consistency" principle during data resource transmission. In other words, when a service requests to transmit data on a fiber channel in the fiber-optic network, a same spectrum needs to be allocated on each optical link.

Figure 2:
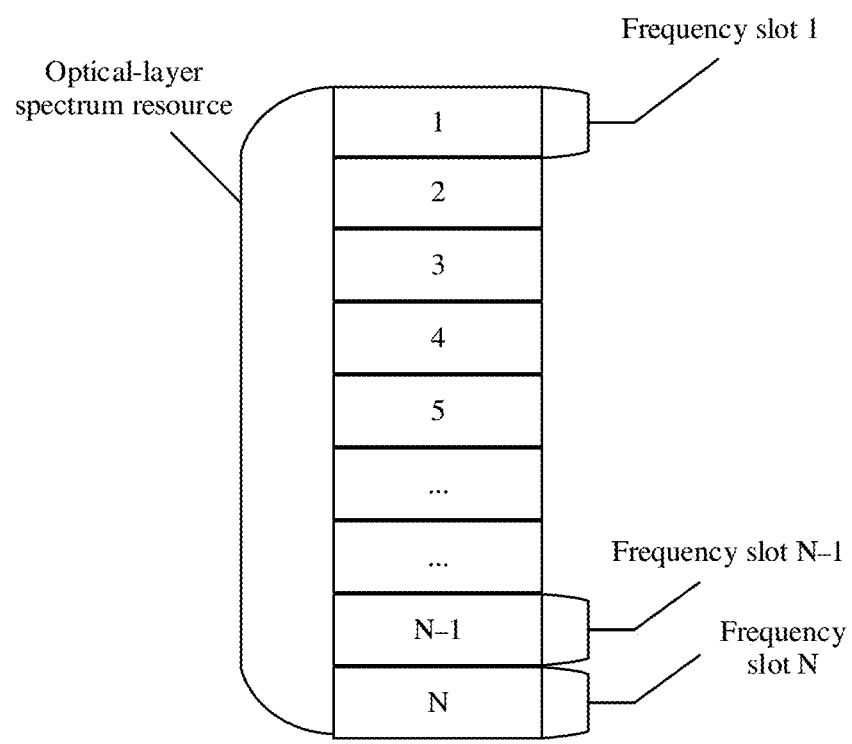
FIG. 2 is a schematic composition diagram of an optical-layer spectrum resource according to an embodiment of this application.

Herein, it should be noted that the spectrum allocation method provided in this application is implemented based on a flexible grid fiber-optic network technology. Referring to FIG. 2, FIG. 2 is a schematic composition diagram of an optical-layer spectrum resource according to an embodiment of this application. For a fiber-optic network, available spectrum resources are fixed. Before spectrum resource allocation, a network device needs to divide an available spectrum resource corresponding to each optical link in the fiber-optic network into N sub-channels with a same spectrum bandwidth by using the flexible grid optical network technology. Each sub-channel is referred to as a frequency slot (or a spectrum grid), for example, a frequency slot 1, a frequency slot 2, to a frequency slot N in FIG. 2. Herein, in specific implementation, one frequency slot may occupy a 12.5-Ghz spectrum bandwidth. After determining a fiber channel for a service, the network device allocates a spectrum resource to the service by using the frequency slot as a basic allocation unit on the premise of following the wavelength consistency principle. In other words, the network device allocates one or more consecutive frequency slots to the service, for each optical link in the fiber channel corresponding to the service to use. In actual use, after determining a fiber channel for a service, the network device searches for T consecutive idle frequency slots starting from a frequency slot N1 based on a transmission bandwidth granularity T of the service (namely, a quantity of frequency slots that need to be used by the fiber channel corresponding to the service) and based on a first priority matching principle, for the service to use. Once the T consecutive idle frequency slots are found, the T consecutive idle frequency slots are immediately allocated to the service. For example, it is assumed that a transmission bandwidth granularity required by the service is 3, and fiber channels corresponding to the service include an optical link L1, an optical link L2, an optical link L3, and an optical link L4. The network device first extracts three frequency slots: the frequency slot 1, the frequency slot 2, and the frequency slot 3, and then sequentially determines whether none of the three frequency slots is occupied on the optical link L1, the optical link L2, the optical link L3, or the optical link L4. If the network device determines that none of the three frequency slots is occupied on the optical link L1, the optical link L2, the optical link L3, or the optical link L4, the network device may allocate the three consecutive frequency slots: the frequency slot 1, the frequency slot 2, and the frequency slot 3, to the service. If the network device determines that any one or more of the three frequency slots are occupied on the optical link L1, the optical link L2, the optical link L3, or the optical link L4, the network device further extracts three frequency slots: the frequency slot 2, the frequency slot 3, and the frequency slot 4 from the N consecutive frequency slots, and repeats the foregoing determining operation, until the frequency slot N−2, the frequency slot N−1, and the frequency slot N are determined. Such an optical-layer spectrum allocation method does not fully consider reasonability of allocated spectrum resources, and therefore cannot actively avoid generation of spectrum fragments. Especially, when there are a plurality of services with different transmission bandwidth granularities at the same time, a probability of generating spectrum fragments becomes higher. As a result, the fiber-optic network has low spectrum resource utilization and a small throughput.

To facilitate understanding of the solutions in this application, the following first describes some concepts in the embodiments of this application.

1. Transmission Bandwidth Granularity

The transmission bandwidth granularity in the embodiments of this application is determined based on a transmission bandwidth required by a service and bandwidths of frequency slots in an optical-layer spectrum resource corresponding to the service, and is mainly used to indicate a quantity of frequency slots that need to be occupied by the service for data transmission. For example, assuming that the network device determines that the transmission bandwidth required by the service received by the network device is 50 Ghz, and each frequency slot in the optical-layer spectrum resource processed based on a flexible grid technology occupies a 12.5-Ghz bandwidth, the network device may determine that the transmission bandwidth granularity corresponding to the service is 4.

2. Spectrum Slice

The spectrum slice described in the embodiments of this application is a spectrum range obtained, after the network device receives a service with a transmission bandwidth granularity for the first time, through division from an optical-layer spectrum resource based on the transmission bandwidth granularity corresponding to the service. The spectrum range may include one or more consecutive frequency slots.

3. Type-1 Spectrum Slice

Figure 3:
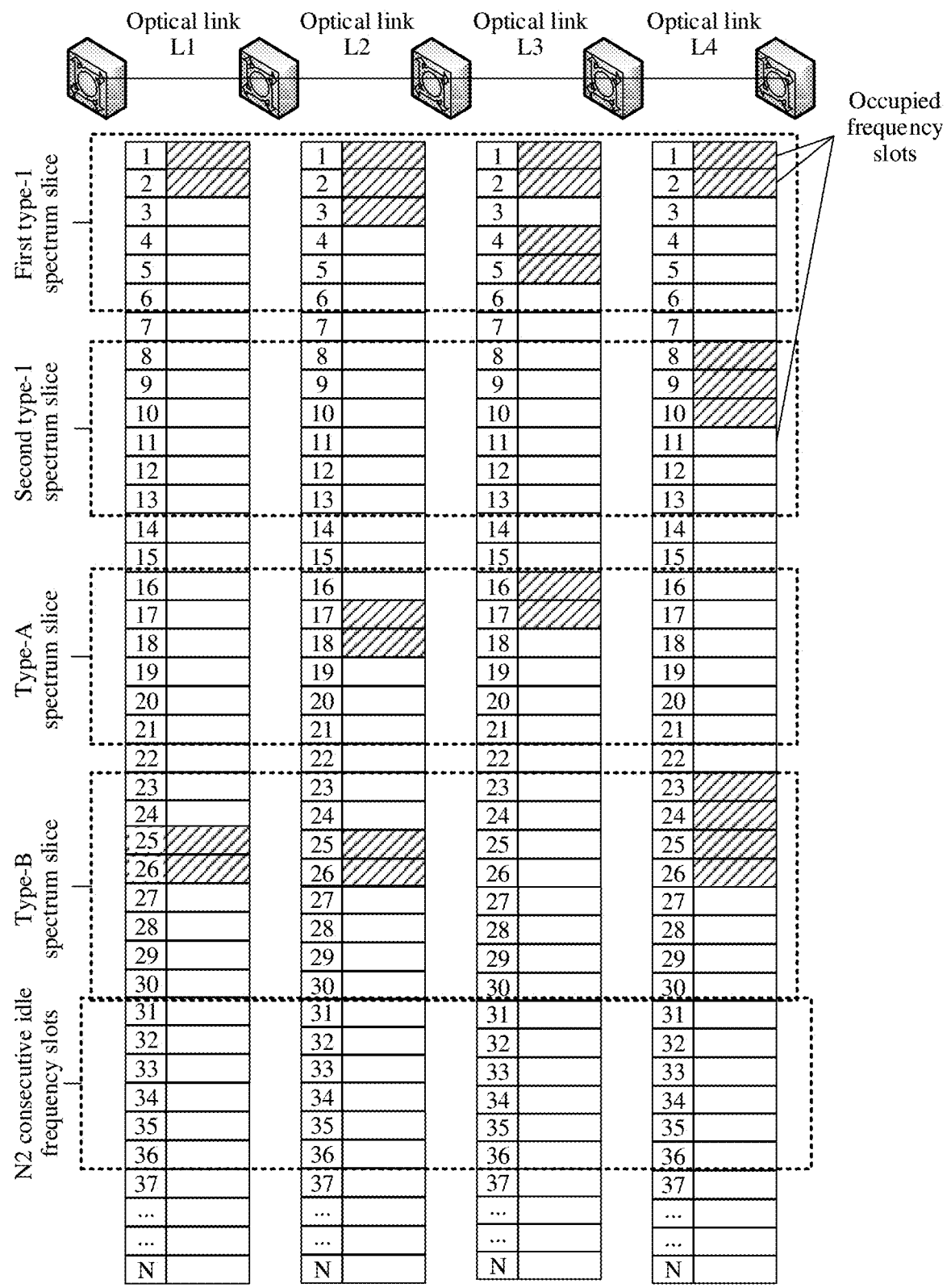
FIG. 3 is a schematic diagram of spectrum slice distribution according to an embodiment of this application.

The type-1 spectrum slice described in the embodiments of this application refers to a spectrum slice obtained through division from the N consecutive frequency slots after the network device receives a service with a transmission bandwidth granularity G1 (described as a target service below) for the first time. In addition, frequency slots included in the type-1 spectrum slice have been occupied only by the service with the transmission bandwidth granularity G1. The type-1 spectrum slice is associated with the transmission bandwidth granularity G1. In other words, a quantity of frequency slots included in the type-1 spectrum slice is a product N2 of the transmission bandwidth granularity G1 of the target service and a positive integer R. For example, referring to FIG. 3 together, FIG. 3 is a schematic diagram of spectrum slice distribution according to an embodiment of this application. Assuming that the transmission bandwidth granularity of the target service is 3, and the positive integer R is 2, the type-1 spectrum slice corresponding to the target service needs to include six frequency slots, for example, the first type-1 spectrum slice in FIG. 3 (including six frequency slots from a frequency slot 1 to a frequency slot 6) or the second type-1 spectrum slice (including six frequency slots from a frequency slot 8 to a frequency slot 13).

4. Type-2 Spectrum Slice

The type-2 spectrum slice described in the embodiments of this application refers to a type of spectrum slice other than the type-1 spectrum slice included in the N consecutive frequency slots. Herein, the type-2 spectrum slice may include a type-A spectrum slice and/or a type-B spectrum slice. The type-A spectrum slice is a spectrum slice that may be occupied by at least two types of services with different transmission bandwidth granularities. A quantity of frequency slots included in the type-A spectrum slice D1 may be N2 or N3. For example, it is assumed that there is one type-1 spectrum slice D1 in the N consecutive frequency slots, and a transmission granularity corresponding to the type-1 spectrum slice D1 is 4. When the network device receives a service whose transmission bandwidth granularity is 5, and allocates an idle frequency slot included in the type-1 spectrum slice D1 to the service whose transmission bandwidth granularity is 5, the type-1 spectrum slice D1 is automatically converted into the type-A spectrum slice. Therefore, it may be understood that a quantity of frequency slots included in the type-A spectrum slice is not unique. The type-B spectrum slice is a spectrum slice determined by the network device from the N frequency slots based on a transmission bandwidth granularity G2 other than the transmission bandwidth granularity G1 corresponding to the target service. A quantity N3 of frequency slots included in the type-B spectrum slice is a product of the transmission bandwidth granularity G2 and a positive integer R, and G2 is not equal to G1. In addition, the type-B spectrum slice has been occupied only by a service with the transmission bandwidth granularity G2. For example, it is assumed that the transmission bandwidth granularity of the target service is 3, and the positive integer R is 2. Referring to FIG. 3 together, FIG. 3 shows a type-A spectrum slice that includes six frequency slots (including a frequency slot 16 to a frequency slot 21) and that corresponds to the target service. In addition, FIG. 3 further shows a type-B spectrum slice that includes eight frequency slots (including a frequency slot 23 to a frequency slot 30) and that corresponds to the target service. A quantity 8 of frequency slots included in the type-B spectrum slice is a product of positive integers 2 and 4. Therefore, it can be learned from the definition of the type-1 spectrum slice that, from another perspective, the type-B spectrum slice may also be a type-1 spectrum slice corresponding to a service whose transmission bandwidth granularity is 4.

Embodiment 1

Figure 4:
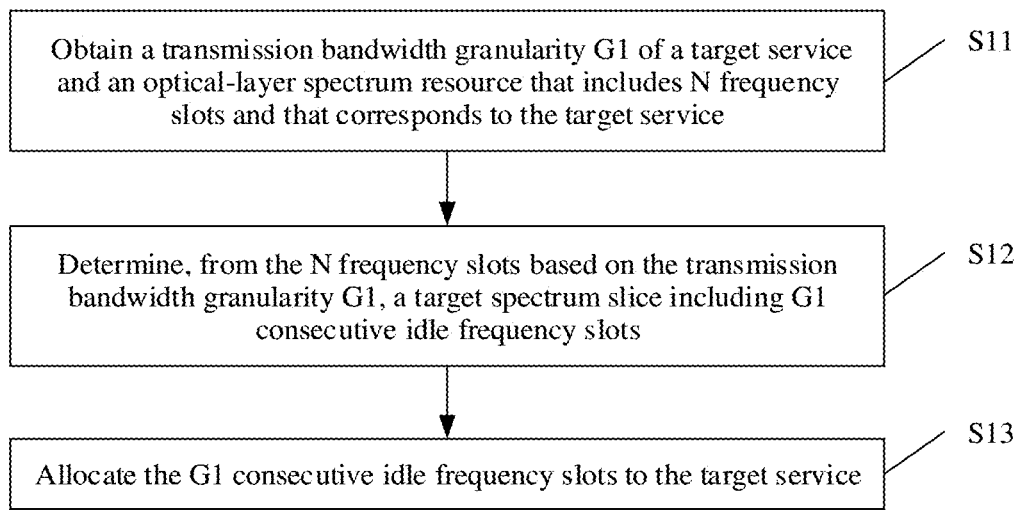
FIG. 4 is a schematic flowchart of a spectrum allocation method according to an embodiment of this application.

To resolve a problem of low spectrum resource utilization of a fiber-optic network caused by non-proper spectrum resource allocation, this application provides a spectrum allocation method. Referring to FIG. 4, FIG. 4 is a schematic flowchart of a spectrum allocation method according to an embodiment of this application. Herein, it should be noted that in this embodiment of this application, a network device is used as an execution body for description. A target fiber channel in this embodiment includes an optical link L1, an optical link L2, an optical link L3, and an optical link L4.

As shown in FIG. 4, the spectrum allocation method includes the following content.

S11. Obtain a transmission bandwidth granularity G1 of a target service and an optical-layer spectrum resource that includes N frequency slots and that corresponds to the target service.

In some implementations, after receiving the target service, the network device may first parse a request signal corresponding to the target service to obtain the transmission bandwidth granularity G1 required by the target service. The network device may further parse the request signal to obtain a source point (namely, a start node of the target fiber channel used by a data resource corresponding to the target service in the fiber-optic network) and a sink point (namely, a last node of the target fiber channel corresponding to the target service) corresponding to the target service. Then, the network device may determine one or more target fiber channels for the target service based on the transmission bandwidth granularity G1 of the target service, and the source point and the sink point of the target fiber channel, and in combination with a common path finding algorithm. Herein, the target fiber channel specifically includes one or more optical links.

It should be noted that the network device may determine a plurality of target fiber channels for the target service, but processes of allocating the spectrum resource by the network device to all of the plurality of target fiber channels are the same. Therefore, this embodiment describes only a process of allocating the spectrum resource by the network device to one target fiber channel of the target service. Specifically, with reference to the fiber-optic network shown in FIG. 1, in this embodiment, a spectrum allocation process of the network device is described in detail by using the fiber channel L including the optical link L1, the optical link L2, the optical link L3, and the optical link L4 as the target fiber channel of the target service.

After obtaining the transmission bandwidth granularity of the target service and the target fiber channel, the network device may further obtain an optical-layer spectrum resource corresponding to the target fiber channel. Herein, the optical-layer spectrum resource is preset. Referring to FIG. 2 together, the optical-layer spectrum resource includes N consecutive frequency slots, and spectrum bandwidths of all frequency slots of the N consecutive frequency slots are the same. It should be noted that, in this embodiment, an arrangement order of the frequency slots of the N consecutive frequency slots is determined based on communication optical wavelengths corresponding to the frequency slots. For example, one arrangement order is arrangement in ascending order of the communication optical wavelengths (described as a first arrangement order below), namely, a frequency slot 1 to a frequency slot N. Another arrangement order is arrangement in descending order of the communication optical wavelengths (described as a second arrangement order below), namely, a frequency slot N to a frequency slot 1. It may be understood that the first arrangement order or the second arrangement order is merely an optional arrangement order in this solution, and does not have a limitation effect. In this embodiment of this application, the first arrangement order is used as an example for description.

S12. Determine, from the N frequency slots based on the transmission bandwidth granularity G1, a target spectrum slice including G1 consecutive idle frequency slots.

In some implementations, after obtaining the transmission bandwidth granularity G1 corresponding to the target service and the N consecutive frequency slots, the network device may first determine the target spectrum slice from the N consecutive frequency slots based on the transmission bandwidth granularity. Herein, the target spectrum slice may include N1 consecutive frequency slots. The target spectrum slice (namely, the N1 consecutive frequency slots) needs to include at least G1 consecutive idle frequency slots. The idle frequency slot refers to a frequency slot in which the optical link L1, the optical link L2, the optical link L3, and the optical link L4 are all in an idle state. Herein, N is greater than N1, and N1 is greater than or equal to G1.

In an implementation, the network device may determine the target spectrum slice from the N consecutive frequency slots in the following two target spectrum slice determining manners.

Figure 5:
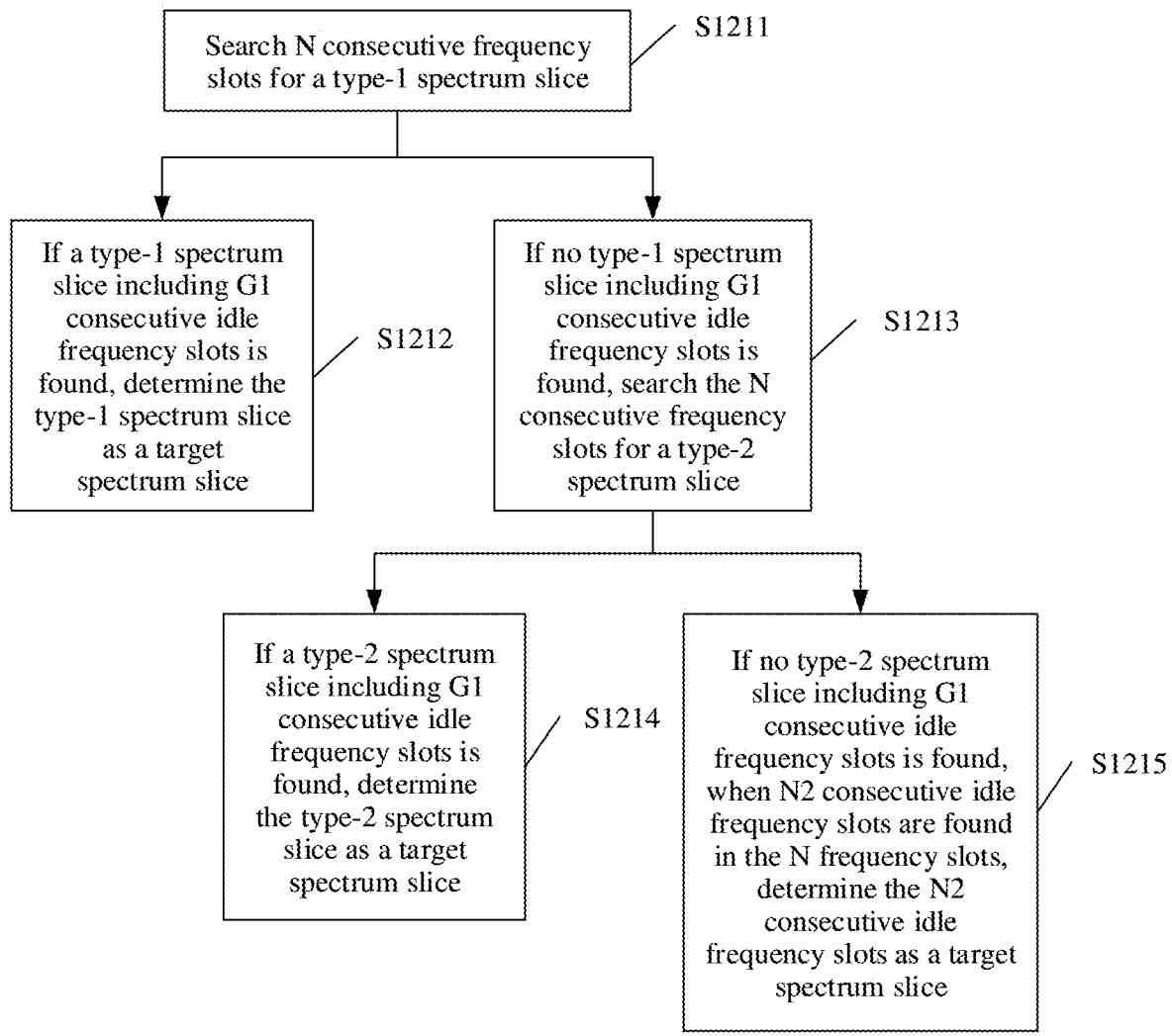
FIG. 5 is a schematic flowchart of a target spectrum slice determining manner 1 according to an embodiment of this application.

Target Spectrum Slice Determining Manner 1:

Referring to FIG. 5 together, FIG. 5 is a schematic flowchart of a target spectrum slice determining manner 1 according to an embodiment of this application. It can be learned from FIG. 5 that the target spectrum slice determining manner 1 mainly includes the following content.

S1211. Search the N consecutive frequency slots for a type-1 spectrum slice.

S1212. If a type-1 spectrum slice including G1 consecutive idle frequency slots is found, determine the type-1 spectrum slice as the target spectrum slice.

S1213. If no type-1 spectrum slice including G1 consecutive idle frequency slots is found, search the N consecutive frequency slots for a type-2 spectrum slice.

S1214. If a type-2 spectrum slice including G1 consecutive idle frequency slots is found, determine the type-2 spectrum slice as the target spectrum slice.

S1215. If no type-2 spectrum slice including G1 consecutive idle frequency slots is found, when N2 consecutive idle frequency slots are found in the N consecutive frequency slots, determine the N2 consecutive idle frequency slots as the target spectrum slice.

For step S1211, in specific implementation, the network device may first search the N consecutive frequency slots for the type-1 spectrum slice in any of the following two type-1 spectrum slice search manners.

Type-1 Spectrum Slice Search Manner 1:

The network device may first select one frequency slot N1 from N−G1+1 frequency slots that are arranged first in the N frequency slots. Herein, the network device may randomly select one frequency slot N1 from the N−G1+1 frequency slots, or may sequentially select one frequency slot N1 from the N−G1+1 frequency slots based on the first arrangement order. This is not limited herein. For example, referring to FIG. 3 together, the network device may randomly select the frequency slot 3 and then randomly select the frequency slot 2, or the network device may first select the frequency slot 1 and then select the frequency slot 2 based on the first arrangement order, and so on. Then, the network device may extract, from a storage device connected to the network device, an identification information set corresponding to the N consecutive frequency slots. The identification information set includes N pieces of identification information, and one frequency slot corresponds to one piece of identification information. Herein, identification information corresponding to any frequency slot 1 of the frequency slots is used to indicate a type of a spectrum slice to which the frequency slot 1 belongs and an arrangement order of the spectrum slice to which the frequency slot 1 belongs in the types of spectrum slices. In actual application, a format of identification information corresponding to the frequency slot 1 may be specifically [type, arrangement number]. A type parameter in the identification information is used to indicate a type of the spectrum slice to which the frequency slot 1 belongs, and the arrangement number parameter is used to indicate an arrangement order of the spectrum slice to which the frequency slot 1 belongs in a same spectrum slice (generally, a spectrum slice is arranged in a same spectrum slice of the frequency slot 1 based on the first arrangement order). For example, it is assumed that identification information corresponding to the frequency slot 1 is [type-1, 1], namely, it indicates that the frequency slot 1 belongs to a type-1 spectrum slice in the N frequency slots. In addition, based on the first arrangement order, the type-1 spectrum slice to which the frequency slot 1 belongs is the first one of the one or more type-1 spectrum slices included in the N frequency slots.

Then, the network device may extract, from the identification information set, identification information corresponding to the frequency slots of the G1 consecutive frequency slots among which the frequency slot N1 is the first frequency slot. After obtaining the identification information corresponding to the frequency slots of the G1 consecutive frequency slots among which the frequency slot N1 is the first frequency slot, the network device may determine, based on the identification information corresponding to the frequency slots, whether the G1 consecutive frequency slots all belong to a same type-1 spectrum slice. If the network device determines that the G1 consecutive frequency slots all belong to a same type-1 spectrum slice, the network device may continue to obtain identification information corresponding to a plurality of frequency slots adjacent to the G1 consecutive frequency slots, and determine one by one whether the frequency slots and the frequency slot N1 belong to a same type-1 spectrum slice, until all frequency slots included in the type-1 spectrum slice to which the frequency slot N1 belongs are determined in the N frequency slots. In this case, the network device may determine that the network device finds one type-1 spectrum slice in the N frequency slots. If the network device determines that the G1 consecutive frequency slots do not belong to a same type-1 spectrum slice, the network device may reselect one frequency slot Nj from N–G1 frequency slots other than the frequency slot N1 in the N–G1+1 frequency slots. Then, the network device may extract, from the identification information set, identification information corresponding to the frequency slot of the G1 consecutive frequency slots among which the frequency slot Nj is the first frequency slot, and repeatedly perform the foregoing determining operation, thereby determining whether one type-1 spectrum slice is found in the N frequency slots. By analogy, the network device always reselects one new start frequency slot and performs a same determining operation until one type-1 spectrum slice is found or no type-1 spectrum slice is found after the N–G1+1 frequency slots are traversed.

For example, refer to FIG. 3 together. It is assumed that the transmission bandwidth granularity of the target service is 3, and a preset reference frequency bandwidth is 2. After obtaining the transmission bandwidth granularity of the target service and the preset reference frequency bandwidth, the network device may determine that the type-1 spectrum slice corresponding to the target service needs to include six frequency slots. The network device may first select the frequency slot 1 from the N–3 frequency slots arranged first as the start frequency slot, and obtain, from the identification information set, identification information corresponding to the three frequency slots: the frequency slot 1, the frequency slot 2, and the frequency slot 3. Herein, it is assumed that identification information corresponding to the frequency slot 1 is [type-1, 1], identification information corresponding to the frequency slot 2 is [type-1, 1], and identification information corresponding to the frequency slot 3 is [first type-1, 1]. When detecting that the three frequency slots: the frequency slot 1, the frequency slot 2, and the frequency slot 3 correspond to same identification information, the network device may determine that the frequency slot 1, the frequency slot 2, and the frequency slot 3 all belong to the first type-1 spectrum slice, namely, may determine that there is the first type-1 spectrum slice in the N consecutive frequency slots. Then, the network device may detect frequency slots adjacent to the frequency slot 3, until three remaining frequency slots of the first type-1 spectrum slice are found. Finally, the network device may determine that there is the first type-1 spectrum slice in the N consecutive frequency slots, and the first type-1 spectrum slice includes six frequency slots: the frequency slot 1, the frequency slot 2, and the frequency slot 3, the frequency slot 4, the frequency slot 5, and the frequency slot 6.

Type-1 Spectrum Slice Search Manner 2:

Alternatively, the network device may first extract, from a storage device connected to the network device, slice distribution information corresponding to the N consecutive frequency slots. Herein, the slice distribution information is used to indicate distribution of spectrum slices in the N consecutive frequency slots. For example, the slice distribution information may specifically indicate a quantity of type-1 spectrum slices in the N consecutive frequency slots, and a quantity of frequency slots included in each type-1 spectrum slice. For example, with reference to FIG. 3, the slice distribution information may indicate that the N consecutive frequency slots include the first type-1 spectrum slice, and the frequency slot 1 to the frequency slot 6 belong to the first type-1 spectrum slice. After obtaining the slice distribution information, the network device may directly find the first type-1 spectrum slice in the N consecutive frequency slots based on the slice distribution information.

For step S1212, after finding the first type-1 spectrum slice in the N consecutive frequency slots, the network device may search the first type-1 spectrum slice for G1 consecutive idle frequency slots. Specifically, the network device may obtain spectrum occupation information corresponding to the N consecutive frequency slots. The spectrum occupation information is used to represent occupation statuses of the N consecutive frequency slots on the optical links in the fiber-optic network. Then, the network device may select G1 consecutive frequency slots from the first type-1 spectrum slice, determine, based on the spectrum occupation information corresponding to the N consecutive frequency slots, whether none of the frequency slots of the G1 consecutive frequency slots is occupied on the optical link L1, the optical link L2, the optical link L3, or the optical link L4. If the network device determines that none of the frequency slots is occupied on the optical link L1, the optical link L2, the optical link L3, or the optical link L4, the network device may determine that there are G1 consecutive idle frequency slots in the first type-1 spectrum slice, and may determine the first type-1 spectrum slice as the target spectrum slice. If the network device determines that any one or more frequency slots of the frequency slots are occupied on the optical link L1, the optical link L2, the optical link L3, or the optical link L4, the network device may reselect new G1 consecutive frequency slots from the first type-1 spectrum slice, and continue to determine whether the G1 consecutive frequency slots are idle frequency slots, until the network device finds the G1 consecutive idle frequency slots in the first type-1 spectrum slice or still does not find the G1 consecutive idle frequency slots after all frequency slots in the first type-1 spectrum slice are traversed. A specific process is described above, and details are not described herein again. If the network device finds the G1 consecutive idle frequency slots in the first type-1 spectrum slice, the network device may continue to search the N consecutive frequency slots for a second type-1 spectrum slice. If the network device finds the second type-1 spectrum slice, the network device continues to determine whether there are G1 consecutive idle frequency slots in the second type-1 spectrum slice. If the G1 consecutive idle frequency slots are determined from the found second type-1 spectrum slice, the network device may determine the second type-1 spectrum slice as the target spectrum slice. A spectrum resource available for the target service may be more likely to exist in the type-1 spectrum slice associated with the transmission bandwidth granularity of the target service, and allocating the spectrum resource to the target service in the type-1 spectrum slice can effectively avoid generation of spectrum fragments. Therefore, the type-1 spectrum slice is preferentially searched for a spectrum resource required by the target service, so that a spectrum allocation rate can be increased, a spectrum fragmentation rate of the fiber-optic network can be reduced, and spectrum utilization of the fiber-optic network can be improved.

With reference to FIG. 3, the following describes an example in which the network device searches the N consecutive frequency slots for the type-1 spectrum slice and determines the type-1 spectrum slice including G1 consecutive idle frequency slots as the target spectrum slice. Herein, an example in which the network device uses the type-1 spectrum slice search manner 1 is used. With reference to FIG. 3, it is assumed that the transmission bandwidth granularity of the target service is 3, a preset reference frequency bandwidth is 2, and the N consecutive frequency slots include the first type-1 spectrum slice and the second type-1 spectrum slice. The first type-1 spectrum slice includes the six frequency slots from the frequency slot 1 to the frequency slot 6, and the second type-1 spectrum slice includes the six frequency slots from the frequency slot 8 to the frequency slot 13. After finding the first type-1 spectrum slice, the network device may first select the three frequency slots: the frequency slot 1, the frequency slot 2, and the frequency slot 3, and then determine, based on the spectrum occupation information corresponding to the N consecutive frequency slots, whether the frequency slot 1, the frequency slot 2, and the frequency slot 3 are occupied on the optical link L1, the optical link L2, the optical link L3, and the optical link L4. It can be learned from FIG. 3 that the network device may finally determine that the frequency slot 1 and the frequency slot 2 are occupied on the optical link L1, the optical link L3, and the optical link L4, and the frequency slot 1, the frequency slot 2, and the frequency slot 3 are occupied on the optical link L2. Then, the network device may select the three frequency slots: the frequency slot 2, the frequency slot 3, and the frequency slot 4, and then continue to determine whether none of the three frequency slots: the frequency slot 2, the frequency slot 3, and the frequency slot 4, is occupied on the optical link L1, the optical link L2, the optical link L3, or the optical link L4. When the network device determines that the three frequency slots: the frequency slot 2, the frequency slot 3, and the frequency slot 4 are also occupied on the optical link L1, the optical link L2, the optical link L3, and the optical link L4, the network device may continue to select the three frequency slots: the frequency slot 3, the frequency slot 4, and the frequency slot 5, and perform the same determining operation as above. After the network device selects the three frequency slots: the frequency slot 4, and the frequency slot 5, the frequency slot 6, and determines that the frequency slot 4 and the frequency slot 5 are occupied on the optical link L3, the network device may determine that there are no three consecutive idle frequency slots in the first type-1 spectrum slice, and the network device may find a type-1 spectrum slice other than the first type-1 spectrum slice in the N frequency slots. For a specific search process, refer to the foregoing process of searching for the type-1 spectrum slice. Details are not described herein again. When the network device finds the second type-1 spectrum slice shown in FIG. 3, the network device may continue to determine whether there are three consecutive idle frequency slots in the second type-1 spectrum slice. For a specific process, refer to the foregoing process of determining whether there are three consecutive idle frequency slots in the first type-1 spectrum slice. Details are not described herein again. It can be learned with reference to FIG. 3 that after the network device selects the three frequency slots: the frequency slot 12, the frequency slot 13, and the frequency slot 14 included in the second type-1 spectrum slice, it can be determined that none of the three frequency slots is occupied on the optical link L1, the optical link L2, the optical link L3, or the optical link L4. Therefore, the network device may determine that the second type-1 spectrum slice includes three consecutive idle frequency slots, and may determine the second type-1 spectrum slice as the target spectrum slice.

For step S1213 and step S1214, if the network device does not find the type-1 spectrum slice in the N consecutive frequency slots, or none of the one or more type-1 spectrum slices found by the network device includes G1 consecutive idle frequency slots, the network device may search the N consecutive frequency slots for a type-2 spectrum slice. When the network device finds a type-2 spectrum slice including G1 consecutive idle frequency slots, the network device may determine the type-2 spectrum slice as the target spectrum slice. The following uses three scenarios in which the type-2 spectrum slice includes a type-A spectrum slice, the type-2 spectrum slice includes a type-B spectrum slice, and the type-2 spectrum slice includes a type-A spectrum slice and a type-B spectrum slice as examples to describe in detail the process in which the network device searches the N consecutive frequency slots for a type-2 spectrum slice, and determines the type-2 spectrum slice including G1 consecutive idle frequency slots as the target spectrum slice Implementation Scenario 1 (the Type-2 Spectrum Slice Includes a Type-A Spectrum Slice):

If the network device does not find the type-1 spectrum slice in the N consecutive frequency slots, or none of the one or more type-1 spectrum slices found by the network device includes G1 consecutive idle frequency slots, the network device may search the N consecutive frequency slots for the type-A spectrum slice. For the process in which the network device searches the N consecutive frequency slots for the type-A spectrum slice, refer to the foregoing process in which the network device searches the N consecutive frequency slots for the type-1 spectrum slice. Details are not described herein again. When the network device finds the first type-A spectrum slice in the N consecutive frequency slots, the network device may determine, based on the spectrum occupation information corresponding to the N consecutive frequency slots, whether the first type-A spectrum slice includes G1 consecutive idle frequency slots. For the process in which the network device determines whether the first type-A spectrum slice includes G1 consecutive idle frequency slots, refer to the foregoing process in which the network device determines whether the first type-1 spectrum slice includes G1 consecutive idle frequency slots. Details are not described herein again. When the network device determines that there are G1 consecutive idle frequency slots in the first type-A spectrum slice, the network device may determine the first type-A spectrum slice as the target spectrum slice. If determining that there are no G1 consecutive idle frequency slots in the first type-A spectrum slice, the network device may search the N consecutive frequency slots for the second type-A spectrum slice, and continue to determine whether there are G1 consecutive idle frequency slots in the second type-A spectrum slice. The network device may repeat the foregoing operation until the type-A spectrum slice including G1 consecutive idle frequency slots is found in the N frequency slots, or no type-A spectrum slice including G1 consecutive idle frequency slots is found after all frequency slots are traversed.

For example, referring to FIG. 3 together, when the network device does not find the type-1 spectrum slice including G1 consecutive idle frequency slots in the N consecutive frequency slots (namely, it is assumed that neither the first type-1 spectrum slice nor the second type-1 spectrum slice in FIG. 3 includes three consecutive idle frequency slots), the network device may search the N consecutive frequency slots for the type-A spectrum slice. After finding a type-A spectrum slice including the six frequency slots from the frequency slot 16 to the frequency slot 21, the network device may search the six frequency slots from the frequency slot 16 to the frequency slot 21 for three consecutive idle frequency slots. After selecting the three frequency slots: the frequency slot 19, the frequency slot 20, and the frequency slot 21, the network device may determine that none of the three frequency slots is occupied on the optical link L1, the optical link L2, the optical link L3, or the optical link L4. Therefore, the network device may determine the type-A spectrum slice as the target spectrum slice.

The type-A spectrum slice provides spectrum resources for services with different transmission bandwidth granularities, so that a plurality of services with different transmission bandwidth granularities can share a same spectrum slice. This can avoid a waste of spectrum resources caused by a relatively small quantity of services with a transmission bandwidth granularity, and can improve spectrum resource utilization of the fiber-optic network.

Implementation Scenario 2 (the Type-2 Spectrum Slice Includes a Type-B Spectrum Slice):

If the network device does not find the type-1 spectrum slice in the N consecutive frequency slots, or none of the one or more type-B spectrum slices found by the network device includes G1 consecutive idle frequency slots, the network device may search the N consecutive frequency slots for the type-B spectrum slice. For the process in which the network device searches the N consecutive frequency slots for the type-B spectrum slice, refer to the foregoing process in which the network device searches the N consecutive frequency slots for the type-B spectrum slice. Details are not described herein again.

In a specific implementation, each time one type-B spectrum slice is found, the network device may determine whether the type-B spectrum slice includes G1 consecutive idle frequency slots. For the process in which the network device determines whether the type-B spectrum slice includes G1 consecutive idle frequency slots, refer to the foregoing process in which the network device determines whether the first type-1 spectrum slice includes G1 consecutive idle frequency slots. Details are not described herein again. If the network device finds G1 consecutive idle frequency slots in the type-B spectrum slice found by the network device, the network device may determine the type-B spectrum slice as the target spectrum slice. The network device may repeat the foregoing operation until the type-B spectrum slice including G1 consecutive idle frequency slots is found in the N frequency slots, or no type-B spectrum slice including G1 consecutive idle frequency slots is found after all frequency slots are traversed.

For example, referring to FIG. 3 together, when the network device does not find the type-1 spectrum slice including G1 consecutive idle frequency slots in the N consecutive frequency slots (namely, assuming that neither the first type-1 spectrum slice nor the second type-1 spectrum slice in FIG. 3 includes three consecutive idle frequency slots, and there is no type-A spectrum slice), the network device may search the N consecutive frequency slots for the type-B spectrum slice. After finding a type-B spectrum slice including eight frequency slots from the frequency slot 23 to the frequency slot 30, the network device may search the eight frequency slots from the frequency slot 23 to the frequency slot 30 for three consecutive idle frequency slots. After selecting the three frequency slots: the frequency slot 27, the frequency slot 28, and the frequency slot 29, the network device may determine that none of the three frequency slots is occupied on the optical link L1, the optical link L2, the optical link L3, or the optical link L4. Therefore, the network device may determine the type-B spectrum slice as the target spectrum slice.

In another specific implementation, the network device may first find a plurality of type-B spectrum slices included in the N consecutive frequency slots. It is assumed herein that the network device finds M1 type-B spectrum slices, and M1 is greater than or equal to 2. Then, the network device may find M2 target type-B spectrum slices included in the M1 type-B spectrum slices found by the network device. Herein, the target type-B spectrum slice is a type-B spectrum slice including at least G1 consecutive idle frequency slots, and M2 is less than or equal to M1. Then, the network device may extract, from a storage device connected to the network device, spectrum occupation information corresponding to the N consecutive frequency slots, then determine, based on the spectrum occupation information corresponding to the N consecutive frequency slots, spectrum occupation information corresponding to each target type-B spectrum slice of the M2 target type-B spectrum slices, determine, based on the spectrum occupation information corresponding to each target type-B spectrum slice and the transmission bandwidth granularity G1 of the target service, a fragmentation rate corresponding to each target type-B spectrum slice. The fragmentation rate corresponding to each target type-B spectrum slice is used to represent a quantity of spectrum fragments included in the target type-B spectrum slice. Finally, the network device may select a target type-B spectrum slice with a minimum fragmentation rate from the target type-B spectrum slices, and determine the target type-B spectrum slice as the target spectrum slice.

The following uses a scenario in which the M1 type-B spectrum slices include two target type-B spectrum slices as an example to describe the process in which the network device determines the target spectrum slice from the plurality of target type-B spectrum slices. It is assumed that the two target type-B spectrum slices are a first target type-B spectrum slice and a second target type-B spectrum slice. The network device may determine, based on the spectrum occupation information corresponding to the N consecutive frequency slots, first spectrum occupation information corresponding to the first target type-B spectrum slice and second spectrum occupation information corresponding to the second target type-B spectrum slice. Herein, the first spectrum occupation information is used to represent occupation statuses of G2 frequency slots included in the first target type-B spectrum slice on the optical link L1, the optical link L2, the optical link L3, and the optical link L4. The second spectrum occupation information is used to represent occupation statuses of G2 frequency slots included in the second target type-B spectrum slice on the optical link L1, the optical link L2, the optical link L3, and the optical link L4. Then, the network device may calculate, based on the transmission bandwidth granularity G1 and the first spectrum occupation information, a first fragmentation rate corresponding to the first target type-B spectrum slice, and calculate, based on the transmission bandwidth granularity G1 and the second spectrum occupation information, a second fragmentation rate corresponding to the second target type-B spectrum slice. The following uses the process in which the network device calculates, based on the transmission bandwidth granularity G1 and the first spectrum occupation information, a first fragmentation rate corresponding to the first target type-B spectrum slice as an example. The network device may first calculate, based on the first spectrum occupation information, an average value of utilization of the G2 frequency slots in the first target type-B spectrum slice on the optical link L1, the optical link L2, the optical link L3, and the optical link L4. Specifically, the network device may determine, based on the first spectrum occupation information, a quantity C1 of frequency slots occupied by the optical link L1 in the G2 frequency slots, a ratio C1/G2 of the quantity C1 of frequency slots occupied by the optical link L1 to the total quantity G2 of frequency slots is determined as a utilization of the first target type-B spectrum slice on the optical link L1. It is assumed that the utilization is T1 herein. Similarly, the network device may calculate utilization of the first target type-B spectrum slice on the optical link L2, the optical link L3, and the optical link L4 by using the same method. Herein, it is assumed that the utilization is T2, T3, and T4. Finally, the network device may determine an average value of T1, T2, T3, and T4 as an average value of utilization of the first target type-B spectrum slice on the optical links. Then, the network device may obtain a preset average-value threshold. Herein, the preset average-value threshold may be an empirical average value obtained through a plurality of spectrum allocation experiments. When the network device determines that the average value is greater than or equal to the preset average-value threshold, the network device may determine the first fragmentation rate to be null. In other words, the first target type-B spectrum slice does not have a corresponding first fragmentation rate. In addition, the network device may further indicate that the first target type-B spectrum slice cannot be determined as the target spectrum slice.

Figure 6:
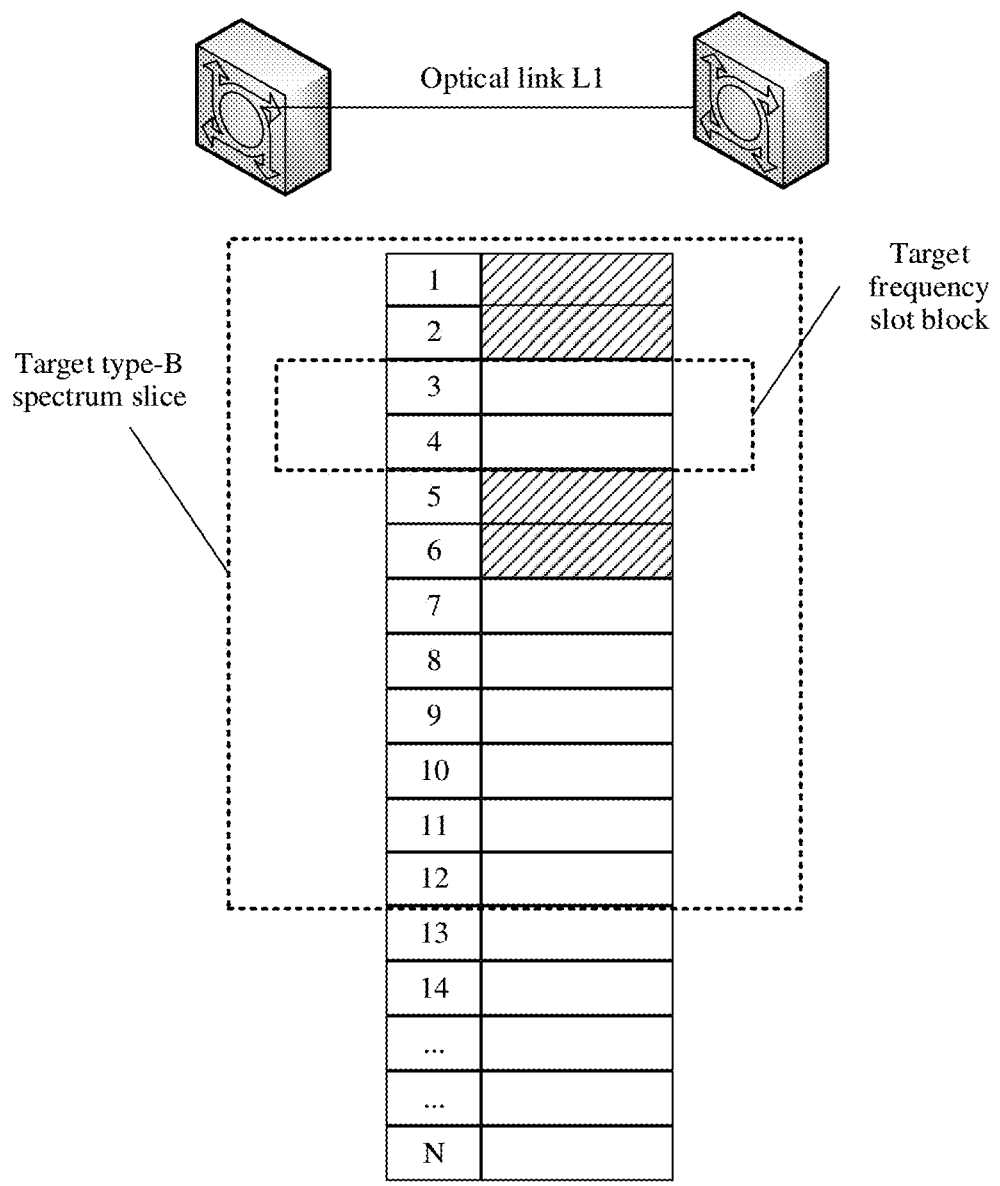
FIG. 6 is a schematic diagram of spectrum fragment distribution according to an embodiment of this application.

If the network device determines that the average value is less than the preset average-value threshold, the network device may continue to count a total fragment quantity of the first target type-B spectrum slice on the target fiber channel based on the first spectrum occupation information. Specifically, the network device may first determine, based on occupation statuses of the G2 frequency slots included in the first spectrum occupation information on the optical link L1, one or more frequency slot blocks that are in the G2 frequency slots and that are not occupied by the optical link L1. Then, a quantity of target frequency slot blocks that may be included in the one or more frequency slot blocks is counted, and the quantity of target frequency slot blocks is determined as the fragment quantity of the first target type-B spectrum slice on the optical link L1. Herein, the target spectrum slot block is a frequency slot block whose quantity of included frequency slots is less than the transmission bandwidth granularity G1. For example, referring to FIG. 6 together, FIG. 6 is a schematic diagram of fragment quantity counting according to an embodiment of this application. In FIG. 6, it is assumed that the 12 frequency slots from the frequency slot 1 to the frequency slot 12 form a first target type-B spectrum slice of the target service, and the transmission bandwidth granularity of the target service is 3. The network device may determine, based on the first spectrum occupation information, that the frequency slot 1 and the frequency slot 2 in the first target type-B spectrum slice are occupied, the frequency slot 3 and the frequency slot 4 are idle, the frequency slot 5 and the frequency slot 6 are occupied, and the frequency slot 7 to the frequency slot 12 are idle. Therefore, the network device may determine, from the first target type-B spectrum slice, a first frequency slot block including the frequency slot 3 and the frequency slot 4 and a second frequency slot block including the six frequency slot blocks from the frequency slot 7 to the frequency slot 12. The network device may detect that a quantity of frequency slots included in the first frequency slot block is less than 3, and a quantity of frequency slots included in the second frequency slot block is greater than 3. Therefore, the network device may determine that the first frequency slot block is a target frequency slot block. In other words, the fragment quantity of the first target type-B spectrum slice on the optical link L1 is 1. Similarly, the network device may further count fragment quantities of the first target type-B spectrum slice on the optical link L2, the optical link L3, and the optical link L4 based on the first spectrum occupation information. Then, the network device may determine the total fragment quantity of the first target type-B spectrum slice on the target fiber channel based on the fragment quantities of the first target type-B spectrum slice on the optical links. Finally, the network device may calculate a ratio of the total fragment quantity to a quantity N2 of frequency slots included in the first target type-B spectrum slice, and obtain a preset ratio threshold. If the network device determines that the ratio is less than the preset ratio threshold, the network device may determine the ratio as the first fragmentation rate corresponding to the first target type-B spectrum slice. If the network device determines that the ratio is greater than or equal to the preset ratio threshold, the network device may determine the first fragmentation rate of the first target type-B spectrum slice to be null. In other words, the first target type-B spectrum slice does not have a corresponding first fragmentation rate. Further, the network device may further indicate that the first target type-B spectrum slice cannot be determined as the target spectrum slice. Similarly, for a process in which the network device calculates a second fragmentation rate of the second target type-B spectrum slice based on the second spectrum occupation information and the transmission bandwidth granularity G1, refer to the foregoing process of calculating the first fragmentation rate of the first target type-B spectrum slice. Details are not described herein again. After the network device calculates the first fragmentation rate of the first target type-B spectrum slice and the second fragmentation rate of the second target type-B spectrum slice, if the network device determines that the first fragmentation rate is less than or equal to the second fragmentation rate, the network device may determine the first target type-B spectrum slice as the target spectrum slice, and if the network device determines that the first fragmentation rate is greater than the second fragmentation rate, the network device may determine the second target type-B spectrum slice as the target spectrum slice. It should be noted herein that, the foregoing describes only a case in which there are two target type-B spectrum slices in the N consecutive frequency slots. However, it may be understood that when there are three or more target type-B spectrum slices, the network device may still calculate fragmentation rates corresponding to the target type-B spectrum slices by using the same method as above, and determine a target type-B spectrum slice with a minimum fragmentation rate as the target spectrum slice. A specific process is not described herein again.

A plurality of target type-B spectrum slices in the N frequency slots are found in advance, and then a spectrum slice with a minimum fragmentation rate is selected as the target spectrum slice, so that a fragment quantity of the determined target spectrum slice is small, and a fragmentation rate of the optical-layer spectrum resource can be further reduced, thereby improving spectrum resource utilization of the fiber-optic network.

Implementation Scenario 3 (the Type-2 Spectrum Slice Includes Both a Type-A Spectrum Slice and a Type-B Spectrum Slice):

The network device may preferentially search the N consecutive frequency slots for a type-A spectrum slice including G1 consecutive idle frequency slots, and determine the type-A spectrum slice as the target spectrum slice. For a specific process, refer to the foregoing process of searching for a type-A spectrum slice including G1 consecutive idle frequency slots, and determining the type-A spectrum slice as the target spectrum slice. Details are not described herein again. Only when the network device does not find the type-A spectrum slice including G1 consecutive idle frequency slots in the N consecutive frequency slots, the network device searches the N consecutive frequency slots for a type-B spectrum slice including G1 consecutive idle frequency slots, and determines the type-B spectrum slice as the target spectrum slice. For example, referring to FIG. 3 together, when the network device does not find the type-1 spectrum slice including G1 consecutive idle frequency slots in the N consecutive frequency slots (namely, assuming that neither the first type-1 spectrum slice nor the second type-1 spectrum slice in FIG. 3 includes three consecutive idle frequency slots), the network device may search the N consecutive frequency slots for the type-A spectrum slice. After finding a type-A spectrum slice including the six frequency slots from the frequency slot 16 to the frequency slot 21, the network device may search the six frequency slots from the frequency slot 16 to the frequency slot 21 for three consecutive idle frequency slots. When the network device determines that the six frequency slots from the frequency slot 16 to the frequency slot 21 do not include three consecutive idle frequency slots (herein it is assumed that the type-A spectrum slice in FIG. 3 does not include three consecutive idle frequency slots), and no other type-A spectrum slices can be found in the N consecutive frequency slots, the network device may search the N consecutive idle frequency slots for a type-B spectrum slice. After finding a type-B spectrum slice including the eight frequency slots from the frequency slot 23 to the frequency slot 30, the network device may search the eight frequency slots from the frequency slot 23 to the frequency slot 30 for three consecutive idle frequency slots. After selecting the three frequency slots: the frequency slot 27, the frequency slot 28, and the frequency slot 29, the network device may determine that none of the three frequency slots is occupied on the optical link L1, the optical link L2, the optical link L3, or the optical link L4. In this case, the network device may determine the type-B spectrum slice as the target spectrum slice.

In a search manner combining the type-A spectrum slice and the type-B spectrum slice, the network device can have a higher probability of determining the target spectrum slice from the N consecutive frequency slots, thereby improving spectrum resource allocation efficiency. In addition, in this manner, a spectrum having idle spectrum resources can be properly utilized in a spectrum allocation process, thereby improving spectrum resource utilization of the fiber-optic network.

For step S1215, further, with reference to the implementation scenario 1, when the network device still does not find the type-A spectrum slice including G1 consecutive idle frequency slots after traversing all frequency slots, the network device may search the N consecutive frequency slots for N2 consecutive idle frequency slots. Herein, the N2 consecutive idle frequency slots are not included in any spectrum slice included in the N consecutive frequency slots. For a specific search process, refer to the foregoing process in which the network device searches the type-1 spectrum slice for G1 consecutive idle frequency slots. Details are not described herein again. If finding N2 consecutive idle frequency slots in the N consecutive frequency slots, the network device may determine the N2 consecutive idle frequency slots as the target spectrum slice. For example, referring to FIG. 3 together, after finding six consecutive idle frequency slots from the frequency slot 31 to the frequency slot 36 in the N consecutive frequency slots, the network device may determine the six consecutive idle frequency slots as the target spectrum slice. It may be understood herein that the N2 consecutive idle frequency slots also form the type-1 spectrum slice corresponding to the service with the transmission bandwidth granularity G1. When determining the N2 consecutive idle frequency slots as the target spectrum slice, the network device may further update identification information of each of the N2 consecutive idle frequency slots, or update the slice distribution information, so that when a next service with the transmission bandwidth granularity G1 arrives, the network device may determine, based on the updated identification information of each of the N2 consecutive idle frequency slots or the updated slice distribution information, that the N2 consecutive idle frequency slots are one type-1 spectrum slice corresponding to the service.

Alternatively, with reference to the implementation scenario 2, when the network device still does not find the type-B spectrum slice including G1 consecutive idle frequency slots after traversing all frequency slots, the network device may search the N consecutive frequency slots for N2 consecutive idle frequency slots. Herein, the N2 consecutive idle frequency slots are not included in any spectrum slice included in the N consecutive frequency slots. For a specific search process, refer to the foregoing process in which the network device searches the type-1 spectrum slice for G1 consecutive idle frequency slots. Details are not described herein again. If finding N2 consecutive idle frequency slots in the N consecutive frequency slots, the network device may determine the N2 consecutive idle frequency slots as the target spectrum slice. For example, referring to FIG. 3 together, after finding the six consecutive idle frequency slots in the frequency slot 31 to the frequency slot 36 from the N consecutive frequency slots, the network device may determine the six consecutive idle frequency slots as the target spectrum slice. It may be understood herein that the N2 consecutive idle frequency slots also form the type-1 spectrum slice corresponding to the service with the transmission bandwidth granularity G1. When determining the N2 consecutive idle frequency slots as the target spectrum slice, the network device further needs to update identification information of each of the N2 consecutive idle frequency slots, so that when a next service with the transmission bandwidth granularity G1 arrives, the network device may determine, based on the updated identification information of each of the N2 consecutive idle frequency slots, that the N2 consecutive idle frequency slots are one type-1 spectrum slice corresponding to the service.

Alternatively, with reference to the implementation scenario 3, when the network device still does not find the type-B spectrum slice including G1 consecutive idle frequency slots after traversing all frequency slots, the network device may search the N consecutive frequency slots for N2 consecutive idle frequency slots, and determine the N2 consecutive idle frequency slots as the target spectrum slice.

For a specific process, refer to the foregoing process in which the network device searches the N consecutive frequency slots for N2 consecutive idle frequency slots, and determines the N2 consecutive idle frequency slots as the target spectrum slice. Details are not described herein again.

Figure 7A:
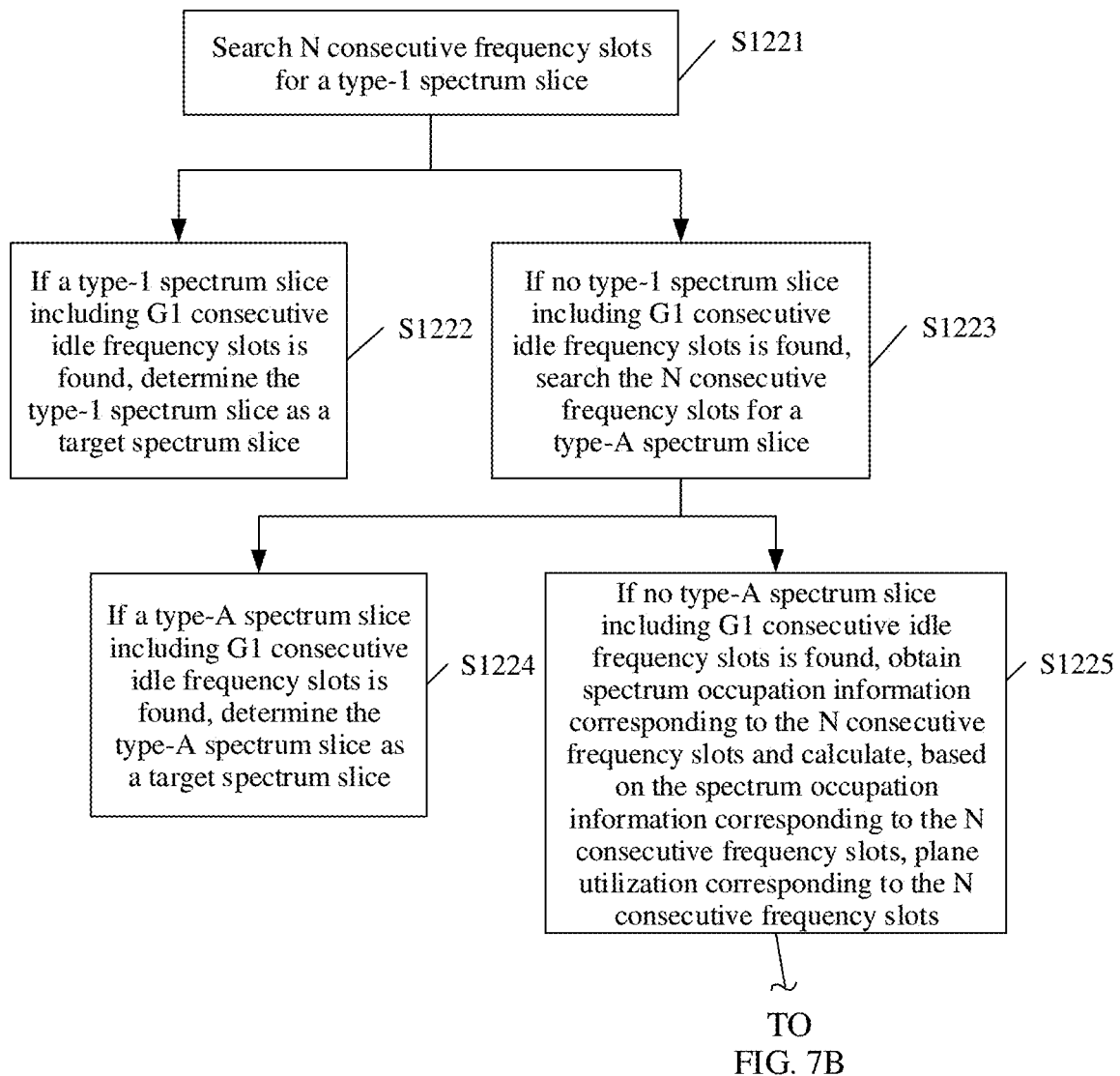
FIG. 7A and FIG. 7B are a schematic flowchart of a target spectrum slice determining manner 2 according to an embodiment of this application.
Figure 7B:
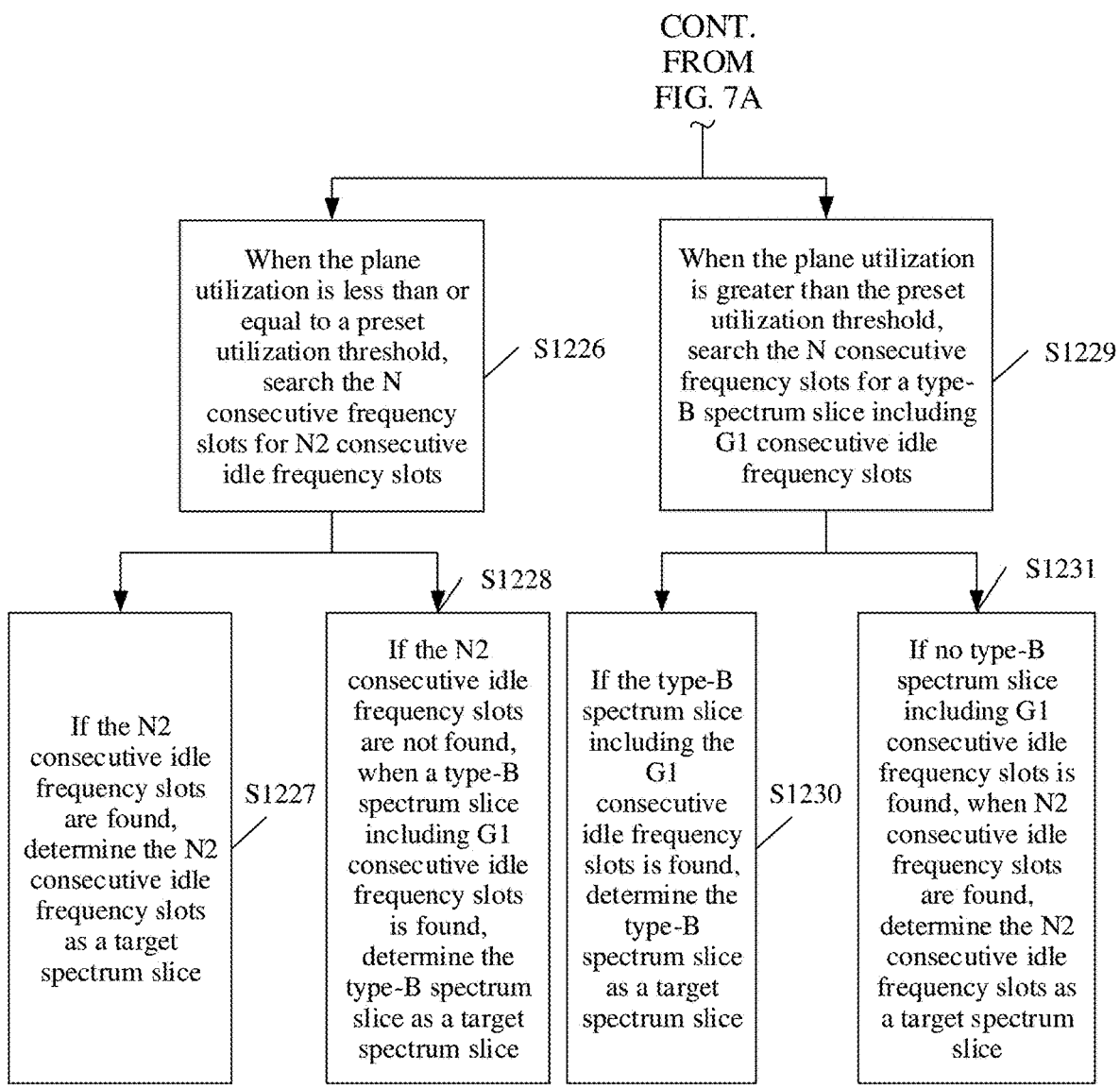

Target Spectrum Slice Determining Manner 2:

FIG. 7A and FIG. 7B are a schematic flowchart of a target spectrum slice determining manner 2 according to an embodiment of this application. Herein, the target spectrum slice determining manner 2 in this embodiment of this application is implemented based on a scenario in which the type-2 spectrum slice includes both a type-A spectrum slice and a type-B spectrum slice. It can be learned from FIG. 7A and FIG. 7B that the target spectrum slice determining manner 2 mainly includes the following content.

S1221. Search the N consecutive frequency slots for a type-1 spectrum slice.

S1222. If a type-1 spectrum slice including G1 consecutive idle frequency slots is found, determine the type-1 spectrum slice as the target spectrum slice.

S1223. If no type-1 spectrum slice including G1 consecutive idle frequency slots is found, search the N frequency slots for the type-A spectrum slice.

S1224. If a type-A spectrum slice including G1 consecutive idle frequency slots is found, determine the type-A spectrum slice as the target spectrum slice.

S1225. If no type-A spectrum slice including G1 consecutive idle frequency slots is found, obtain spectrum occupation information corresponding to the N consecutive frequency slots and calculate, based on the spectrum occupation information corresponding to the N consecutive frequency slots, plane utilization corresponding to the N consecutive frequency slots.

S1226. When the plane utilization is less than or equal to a preset utilization threshold, search the N consecutive frequency slots for N2 consecutive idle frequency slots.

S1227. If the N2 consecutive idle frequency slots are found in the N consecutive frequency slots, determine the N2 consecutive idle frequency slots as the target spectrum slice.

S1228. If the N2 consecutive idle frequency slots are not found, when a type-B spectrum slice including G1 consecutive idle frequency slots is found, determine the type-B spectrum slice as the target spectrum slice.

S1229. When it is determined that the plane utilization is greater than the plane utilization threshold, search the N consecutive frequency slots for the type-B spectrum slice including G1 consecutive idle frequency slots.

S1230. If the type-B spectrum slice including G1 consecutive idle frequency slots is found, determine the type-B spectrum slice as the target spectrum slice.

S1231. If no type-B spectrum slice including G1 consecutive idle frequency slots is found, when N2 consecutive idle frequency slots are found, determine the N2 consecutive idle frequency slots as the target spectrum slice.

For specific implementation processes of step S1221 and step 1222, refer to the process in which the network device searches for the type-1 spectrum slice and determines the found type-1 spectrum slice including G1 consecutive idle frequency slots as the target spectrum slice described in step S1211 and step S1212 in the target spectrum slice determining manner 1. Details are not described herein again.

For specific implementation processes of step S1223 and step 1224, refer to the process in which the network device searches for the type-A spectrum slice and determines the found type-A spectrum slice including G1 consecutive idle frequency slots as the target spectrum slice described in step S1213 and step S1214 in the target spectrum slice determining manner 1. Details are not described herein again.

For step S1225, if the network device determines that no type-A spectrum slice is found, or none of the one or more found type-A spectrum slices includes G1 consecutive idle frequency slots, the network device may extract, from a storage device connected to the network device, spectrum occupation information corresponding to the N consecutive frequency slots, and calculate, based on the spectrum occupation information corresponding to the N consecutive frequency slots, plane utilization corresponding to the N consecutive frequency slots. Herein, the plane utilization is used to represent a status in which the N consecutive frequency slots are occupied by an optical link included in the target fiber channel. Specifically, the network device may determine a quantity K of idle frequency slots of the N consecutive frequency slots based on the spectrum occupation information corresponding to the N consecutive frequency slots, and determine a ratio K/N of the quantity K of idle frequency slots to N as the plane utilization corresponding to the N consecutive frequency slots.

For step S1226, specifically, the network device may first obtain a preset plane utilization threshold. The plane utilization threshold may be an empirical value obtained through a plurality of spectrum allocation experiments by using the spectrum allocation method in this embodiment. When the network device determines that the plane utilization is less than or equal to the plane utilization threshold, the network device may search the N consecutive frequency slots for N2 consecutive idle frequency slots. For a specific search process, refer to the process in which the network device searches the N consecutive frequency slots for N2 consecutive idle frequency slots described in step S1215 in the target spectrum slice determining manner 1. Details are not described herein again.

For step S1227, specifically, after determining that the network device finds N2 consecutive idle frequency slots in the N consecutive frequency slots, the network device may determine the N consecutive idle frequency slots as the target spectrum slice. For a specific process, refer to the process of determining the N consecutive idle frequency slots as the target spectrum slice described in step S1215 in the target spectrum slice determining manner 1. Details are not described herein again.

For step S1228, specifically, if not finding the N2 consecutive idle frequency slots in the N consecutive frequency slots, the network device may search for a type-B spectrum slice including G1 consecutive idle frequency slots in the N consecutive frequency slots, and determine the type-B spectrum slice as the target spectrum slice. For a specific process, refer to the process of searching for a type-B spectrum slice including G1 consecutive idle frequency slots in the N consecutive frequency slots and determining the type-B spectrum slice as the target spectrum slice described in step S1213 and step S1214 in the target spectrum slice determining manner 1. Details are not described herein again.

For step S1229, specifically, when the network device determines that the plane utilization is greater than the plane utilization threshold, the network device may first search the N consecutive frequency slots for a type-B spectrum slice including G1 consecutive idle frequency slots. For a specific process, refer to the process of searching the N consecutive idle frequency slots for a type-B spectrum slice including G1 consecutive idle frequency slots described in step S1213 in the target spectrum slice determining manner 1. Details are not described herein again.

For step S1230, if finding a type-B spectrum slice including G1 consecutive idle frequency slots, the network device may determine the type-B spectrum slice as the target spectrum slice. For a specific process, refer to the process of determining the type-B spectrum slice including G1 consecutive idle frequency slots as the target spectrum slice described in step S1214 in the target spectrum slice determining manner 1. Details are not described herein again.

For step S1231, if the network device does not find the type-B spectrum slice including G1 consecutive idle frequency slots in the N consecutive frequency slots, the network device may search the N consecutive frequency slots for N2 consecutive idle frequency slots, and determine the N2 consecutive idle frequency slots as the target spectrum slice. For a specific process, refer to the process of searching the N consecutive frequency slots for N2 consecutive idle frequency slots and determining the N2 consecutive idle frequency slots found as the target spectrum slice described in step S1215 in the target spectrum slice determining manner 1. Details are not described herein again.

In another feasible implementation, after obtaining the transmission bandwidth granularity G1 corresponding to the target service, the network device may further obtain a preset transmission bandwidth granularity threshold Gt. Herein, the transmission bandwidth granularity threshold Gt may be an empirical value obtained through a plurality of spectrum allocation experiments. When the network device determines that the transmission bandwidth granularity G1 is less than or equal to the transmission bandwidth granularity threshold Gt, the network device may determine the target spectrum slice from the N consecutive frequency slots based on the first arrangement order (namely, arrangement from the frequency slot 1 to the frequency slot N). When the network device determines that the transmission bandwidth granularity G1 is greater than the transmission bandwidth granularity threshold Gt, the network device may determine the target spectrum slice from the N consecutive frequency slots based on the second arrangement order (namely, arrangement from the frequency slot 1 to the frequency slot N). The target spectrum slice is determined from the N consecutive frequency slots based on a size of the transmission bandwidth granularity G1 based on different arrangement orders, so that target spectrum slices determined for services with a same or similar transmission bandwidth granularity are relatively centralized. This can effectively avoid a waste of spectrum resources caused by scattered distribution of spectrum slices in the N consecutive frequency slots, and can improve spectrum resource utilization of the fiber-optic network.

S13. Allocate the G1 consecutive idle frequency slots included in the target spectrum slice to the target service.

In some feasible implementations, after determining the target spectrum slice corresponding to the target service, the network device may allocate the G1 consecutive idle frequency slots included in the target spectrum slice to the target service, so that a data resource corresponding to the target service is used on the target fiber channel.

Optionally, if a quantity of idle frequency slots included in the target spectrum slice is greater than G1, the network device may allocate, to the target service based on a search order used in the process in which the network device determines the target spectrum slice from the N frequency slots, G1 idle spectrums that are arranged first in the idle frequency slots included in the target spectrum slice.

Optionally, when the network device determines that the target spectrum slice is the type-B spectrum slice described above, after allocating the G1 idle frequency slots in the target spectrum slice to the target service, the network device may convert the type-B spectrum slice into the type-A spectrum slice. Specifically, the network device may update identification information corresponding to the frequency slots included in the type-B spectrum slice, or the network device may update slice distribution information corresponding to the N frequency slots, so that the type-B spectrum slice is converted into the type-A spectrum slice.

In this embodiment of this application, after the transmission bandwidth granularity G1 of the target service and N frequency slots corresponding to the target service are obtained, the target spectrum slice corresponding to the target service is found or generated from the N frequency slots based on the transmission bandwidth granularity G1 of the target service, and then, a spectrum resource is allocated to the target service by using spectrum slices as a basic range. One service corresponds to one spectrum slice. In this way, spectrum fragments generated during interleaved allocation of spectrum resources to services with different transmission bandwidth granularities can be reduced, so that a spectrum resource allocation process becomes more proper, spectrum resource utilization of the fiber-optic network is improved, and a throughput of the fiber-optic network is also improved.

Embodiment 2

Figure 8:
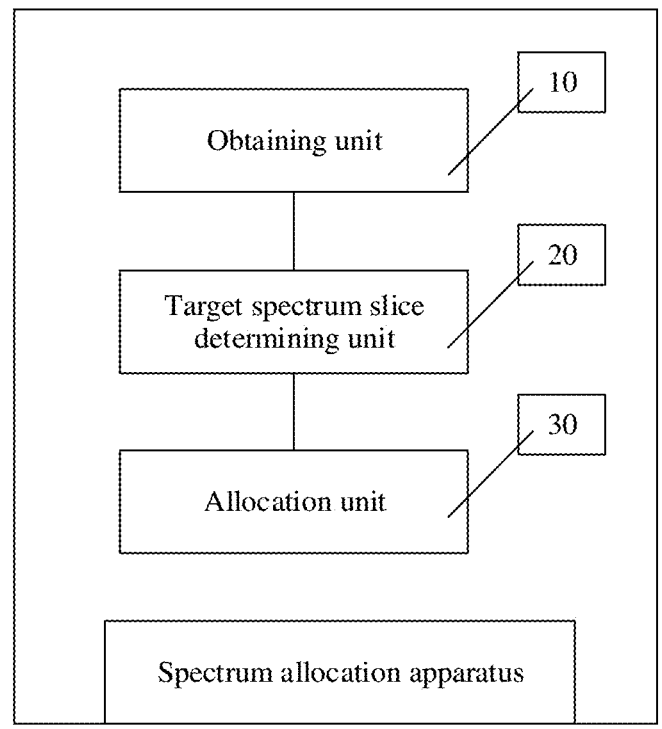
FIG. 8 is a schematic structural diagram of a spectrum allocation apparatus according to an embodiment of this application.

FIG. 8 is a schematic structural diagram of a spectrum allocation apparatus according to an embodiment of this application. The apparatus includes: an obtaining unit 10, configured to obtain a transmission bandwidth granularity G1 of a target service and an optical-layer spectrum resource of a target fiber channel corresponding to the target service, where the optical-layer spectrum resource includes N consecutive frequency slots, and all of the N consecutive frequency slots have a same spectrum bandwidth; a target spectrum slice determining unit 20, configured to determine a target spectrum slice from the N frequency slots based on the transmission bandwidth granularity G1 obtained by the obtaining unit 10, where the target spectrum slice includes N1 consecutive frequency slots, the target spectrum slice includes at least G1 consecutive idle frequency slots, N is greater than N1, and N1 is greater than or equal to G1; an allocation unit 30, configured to allocate the G1 consecutive idle frequency slots included in the target spectrum slice obtained by the target spectrum slice determining unit 20 to the target service.

In a feasible implementation, the target spectrum slice determining unit 20 is configured to: if N2 consecutive idle frequency slots are found in the N consecutive frequency slots, determine the N2 consecutive idle frequency slots as the target spectrum slice, where N2 is a product of the transmission bandwidth granularity G1 and a positive integer R, and N2 is less than N.

In a feasible implementation, the target spectrum slice determining unit 20 is configured to: if one or more type-1 spectrum slices are found in the N frequency slots, and it is detected that any of the one or more type-1 spectrum slices includes G1 consecutive idle frequency slots, determine the any type-1 spectrum slice as the target spectrum slice, where a quantity of frequency slots included in the type-1 spectrum slice is a product N2 of the transmission bandwidth granularity G1 and a positive integer R; or if no type-1 spectrum slice is found in the N frequency slots, or none of the one or more found type-1 spectrum slices includes G1 consecutive idle frequency slots, search the N frequency slots for the type-2 spectrum slice; and if any of the one or more found type-2 spectrum slices includes G1 consecutive idle frequency slots, determine the any type-2 spectrum slice as the target spectrum slice, where the type-2 spectrum slice includes a type-A spectrum slice and/or a type-B spectrum slice. A quantity N3 of frequency slots included in the type-B spectrum slice is a product of a transmission bandwidth granularity G2 and a positive integer R, and G2 is not equal to G1.

A quantity of frequency slots included in the type-A spectrum slice includes N2 and/or N3, and the type-A spectrum slice has been occupied by at least two services with different transmission bandwidth granularities.

In a feasible implementation, when the type-2 spectrum slice includes the type-A spectrum slice and the type-B spectrum slice, the target spectrum slice determining unit 20 is configured to: when any of the one or more type-A spectrum slices found in the N consecutive frequency slots includes G1 consecutive idle frequency slots, determine the any type-A spectrum slice as the target spectrum slice; when no type-A spectrum slice is found in the N consecutive frequency slots, or none of the one or more found type-A spectrum slices includes G1 consecutive idle frequency slots, search the N consecutive frequency slots for the type-B spectrum slice; and if any of the one or more found type-B spectrum slices includes G1 consecutive idle frequency slots, determine the any type-B spectrum slice as the target spectrum slice.

In a feasible implementation, the target spectrum slice determining unit 20 is further configured to: if no type-B spectrum slice is found in the N consecutive frequency slots, or none of the one or more found type-B spectrum slices includes G1 consecutive idle frequency slots, when N2 consecutive idle frequency slots are found in the N consecutive frequency slots, determine the N2 consecutive idle frequency slots as the target spectrum slice.

In a feasible implementation, when the type-2 spectrum slice includes the type-A spectrum slice and the type-B spectrum slice, the target spectrum slice determining unit 20 is further configured to: when any of the one or more type-A spectrum slices found in the N consecutive frequency slots includes G1 consecutive idle frequency slots, determine the any type-A spectrum slice as the target spectrum slice; when no type-A spectrum slice is found in the N consecutive frequency slots, or none of the one or more found type-A spectrum slices includes G1 consecutive idle frequency slots, search the N consecutive frequency slots for the type-B spectrum slice; when the M1 type-B spectrum slices are found, and M2 target type-B spectrum slices are determined from the M1 found type-B spectrum slices, determine the target spectrum slice from the M2 target type-B spectrum slices based on spectrum occupation information of the target type-B spectrum slices. The target type-B spectrum slice is a type-B spectrum slice including G1 consecutive idle frequency slots. The target fiber channel includes L optical links, and spectrum occupation information of any target type-B spectrum slice is used to represent occupation statuses of all frequency slots included in the any target type-B spectrum slice on all of the L optical links.

In a feasible implementation, the M1 target type-B spectrum slices include a first target type-B spectrum slice and a second target type-B spectrum slice, and the target spectrum slice determining unit 20 is configured to: obtain first spectrum occupation information corresponding to the first target type-B spectrum slice and second spectrum occupation information corresponding to the second target type-B spectrum slice; calculate, based on the transmission bandwidth granularity G1 and the first spectrum occupation information, a first fragmentation rate corresponding to the first target type-B spectrum slice, and calculate, based on the transmission bandwidth granularity G1 and the second spectrum occupation information, a second fragmentation rate corresponding to the second target type-B spectrum slice, where any fragmentation rate is used to represent a quantity of spectrum fragments included in the any target type-B spectrum slice; and if the first fragmentation rate is greater than or equal to the second fragmentation rate, determine the second target type-B spectrum slice as the target spectrum slice; and if the first fragmentation rate is less than the second fragmentation rate, determine the first target type-B spectrum slice as the target spectrum slice.

In a feasible implementation, the target spectrum slice determining unit 20 is configured to: calculate an average value of utilization of all frequency slots in the first target type-B spectrum slice on the optical links based on the first spectrum occupation information; if the average value is greater than or equal to a preset average-value threshold, determine the first fragmentation rate to be null; if the average value is less than the preset average-value threshold, count a total fragment quantity of the first target type-B spectrum slice on the target fiber channel based on the first spectrum occupation information; when a ratio of the total fragment quantity of the first target type-B spectrum slice on the target fiber channel to a quantity of frequency slots included in the first target type-B spectrum slice is greater than or equal to a preset ratio threshold, determine the ratio as a first fragmentation rate corresponding to the first slice; and when the ratio is less than the preset ratio threshold, determine the first fragmentation rate to be null.

In a feasible implementation, the target spectrum slice determining unit 20 is configured to: perform the following operations on any optical link 1 in the optical links in the target fiber channel based on the first spectrum occupation information: determining, based on an occupation status that is of the first target type-B spectrum slice on the optical link 1 and that is included in the first spectrum occupation information, one or more frequency slot blocks that are in the first target type-B spectrum slice and that are not occupied by the optical link i; and counting a quantity of target frequency slot blocks included in the one or more frequency slot blocks, and determining the quantity of target frequency slot blocks as a fragment quantity of the first target type-B spectrum slice on the optical link 1, where a quantity of frequency slots included in the target frequency slot block is less than the transmission bandwidth granularity G1; and determining the total fragment quantity of the first target type-B spectrum slice on the target fiber channel based on fragment quantities of the first target type-B spectrum slice on the optical links.

In a feasible implementation, the target spectrum slice determining unit 20 is configured to: calculate an average value of utilization of all frequency slots in the second target type-B spectrum slice on the optical links based on the second spectrum occupation information; if the average value is greater than or equal to a preset average-value threshold, determine the second fragmentation rate to be null; if the average value is less than the preset average-value threshold, count a total fragment quantity of the second target type-B spectrum slice on the target fiber channel based on the second spectrum occupation information; when a ratio of the total fragment quantity of the second target type-B spectrum slice on the target fiber channel to a quantity of frequency slots included in the second target type-B spectrum slice is greater than or equal to a preset ratio threshold, determine the ratio as the second fragmentation rate corresponding to the second slice; and when the ratio is less than the preset ratio threshold, determine the second fragmentation rate to be null.

In a feasible implementation, the target spectrum slice determining unit 20 is configured to: perform the following operations on any optical link 1 in the optical links in the target fiber channel based on the second spectrum occupation information: determining, based on an occupation status that is of the second target type-B spectrum slice on the optical link i and that is included in the second spectrum occupation information, one or more frequency slot blocks that are in the second target type-B spectrum slice and that are not occupied by the optical link i; and counting a quantity of target frequency slot blocks included in the one or more frequency slot blocks, and determining the quantity of target frequency slot blocks as a fragment quantity of the second target type-B spectrum slice on the optical link 1, where a quantity of frequency slots included in the target frequency slot block is less than the transmission bandwidth granularity G1; and determining the total fragment quantity of the second target type-B spectrum slice on the target fiber channel based on fragment quantities of the second target type-B spectrum slice on the optical links.

In a feasible implementation, the obtaining unit 10 may obtain the transmission bandwidth granularity G1 of the target service and the optical-layer spectrum resource of the target fiber channel corresponding to the target service. Herein, the optical-layer spectrum resource includes N consecutive frequency slots, and the frequency slots in the N consecutive frequency slots have a same bandwidth. Then, the target spectrum slice determining unit 20 may determine the target spectrum slice from the N frequency slots based on the transmission bandwidth granularity G1 obtained by the obtaining unit 10. Herein, the target spectrum slice includes N1 consecutive frequency slots, and the target spectrum slice includes at least G1 consecutive idle frequency slots. For a process in which the target spectrum slice determining unit 20 determines the target spectrum slice from the N frequency slots based on the transmission bandwidth granularity G1, refer to the process in which the target spectrum slice is determined from the N frequency slots described in step S12 in Embodiment 1. Details are not described herein again. Finally, the allocation unit 30 may allocate the G1 consecutive idle frequency slots included in the target spectrum slice determined by the target spectrum slice determining unit 20 to the target service.

In this embodiment of this application, after the transmission bandwidth granularity G1 of the target service and the N frequency slots corresponding to the target service are obtained, the target spectrum slice corresponding to the target service is found or generated in the N frequency slots based on the transmission bandwidth granularity G1 of the target service, and then, a spectrum resource is allocated to the target service by using spectrum slices as a basic range. One service corresponds to one spectrum slice. In this way, spectrum fragments generated during interleaved allocation of spectrum resources to services with different transmission bandwidth granularities can be reduced, so that a spectrum resource allocation process becomes more proper, spectrum resource utilization of the fiber-optic network is improved, and a throughput of the fiber-optic network is also improved.

Figure 9:
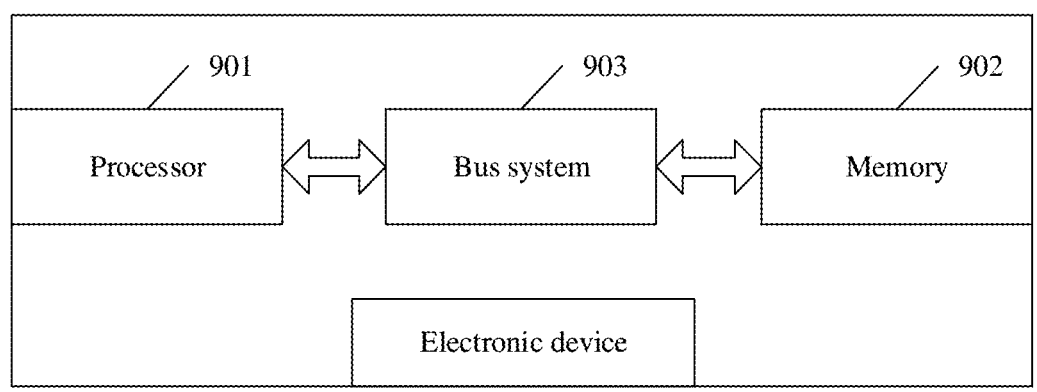
FIG. 9 is a schematic structural diagram of an electronic device according to an embodiment of this application.

FIG. 9 is a schematic structural diagram of an electronic device according to an embodiment of this application. The electronic device provided in this embodiment of this application includes a processor 901, a memory 902, and a bus system 903. The processor 901 and the memory 902 are connected by using the bus system 903.

The memory 902 is configured to store a program. Specifically, the program may include program code, and the program code includes computer operation instructions. The memory 902 includes but is not limited to a random access memory (RAM), a read-only memory (ROM), an erasable programmable read-only memory (EPROM), or a compact disc read-only memory (CD-ROM). FIG. 9 shows only one memory. Certainly, a plurality of memories may be alternatively disposed based on a requirement.

The memory 902 may be alternatively a memory in the processor 901. This is not limited herein.

The memory 902 stores the following elements, executable modules or data structures, or subsets or extended sets thereof: an operation instruction that includes various operation instructions and is used to implement various operations; and an operating system that includes various system programs and is used to implement various basic services and process a hardware-based task.

The processor 901 controls an operation of the electronic device, and the processor 901 may be one or more central processing units (CPU). When the processor 901 is one CPU, the CPU may be a single-core CPU, or may be a multi-core CPU.

During specific application, components of the electronic device are coupled together by using the bus system 903. In addition to a data bus, the bus system 903 may further include a power bus, a control bus, a status signal bus, and the like. However, for clear description, various types of buses in FIG. 9 are all marked as the bus system 903. For ease of representation, only a schematic drawing is shown in FIG. 9.

The spectrum allocation method disclosed in the embodiments of this application may be applied to the processor 901, or implemented by the processor 901. The processor 901 may be an integrated circuit chip and has a signal processing capability.

An embodiment of this application provides a computer-readable storage medium. The computer-readable storage medium stores instructions. When the instructions are run on a computer, the spectrum allocation method described in Embodiment 1 may be implemented.

The computer-readable storage medium may be an internal storage unit of the spectrum allocation apparatus described in Embodiment 2. The computer-readable storage medium may alternatively be an external storage device of the spectrum allocation apparatus, for example, a pluggable hard disk, a smart media card (SMC), a secure digital (SD) card, or a flash card disposed on the spectrum allocation apparatus. Further, the computer-readable storage medium may alternatively include both an internal storage unit and an external storage device of the foregoing spectrum allocation apparatus. The computer-readable storage medium is configured to store the foregoing computer program and other programs and data that are required by the foregoing spectrum allocation apparatus. The computer-readable storage medium may be further configured to temporarily store data that has been output or is to be output.

A person of ordinary skill in the art may understand that all or some of the procedures of the methods in the embodiments may be implemented by a computer program instructing related hardware. The program may be stored in a computer-readable storage medium. When the program is executed, the procedures of the methods in the embodiments may be performed. The foregoing storage medium includes any medium that can store program code, such as a ROM, a random access memory RAM, a magnetic disk, or an optical disc.

The foregoing descriptions are merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining a transmission bandwidth granularity G1 of a target service;
obtaining an optical-layer spectrum resource of a target fiber channel corresponding to the target service, wherein the optical-layer spectrum resource comprises N consecutive frequency slots, and each of the N consecutive frequency slots have a same spectrum bandwidth;
determining a target spectrum slice from the N consecutive frequency slots based on the transmission bandwidth granularity G1, wherein the target spectrum slice comprises Ni consecutive frequency slots, the target spectrum slice comprises at least G1 consecutive idle frequency slots, N is greater than Ni, and Ni is greater than or equal to G1; and
allocating the G1 consecutive idle frequency slots comprised in the target spectrum slice to the target service,
wherein determining the target spectrum slice from the N consecutive frequency slots based on the transmission bandwidth granularity G1 comprises:
in response to determining that the N consecutive frequency slots comprise a type-1 spectrum slice comprising G1 consecutive frequency slots that are idle, determining the a type-1 spectrum slice comprising the G1 consecutive frequency slots that are idle to be the target spectrum slice, wherein a quantity N2 of frequency slots comprised in the type-1 spectrum slice is an integer multiple of the transmission bandwidth granularity G1; or
in response to determining that the N consecutive frequency slots do not comprise any type-1 spectrum slice comprising G1 consecutive frequency slots that are idle, searching the N consecutive frequency slots for a type-2 spectrum slice, and in response to determining that the N consecutive frequency slots comprise a type-2 spectrum slice comprising G1 consecutive frequency slots that are idle, determining the type-2 spectrum slice comprising the G1 consecutive frequency slots that are idle to be the target spectrum slice, and wherein:
each type-2 spectrum slice comprises a type-A spectrum slice or a type-B spectrum slice:
a quantity N3 of frequency slots comprised in each type-B spectrum slice is an integer multiple of a transmission bandwidth granularity G2, and G2 is not equal to G1;
a quantity of frequency slots comprised in each type-A spectrum slice is N2, or a quantity of frequency slots comprised in each type-A spectrum slices is N2 or N3; and
each type-A spectrum slice is occupied by at least two types of services with different transmission bandwidth granularities; and wherein the target fiber channel comprises L optical links, type-2 spectrum slices of the optical-layer spectrum resource comprise at least one type-A spectrum slice and at least one type-B spectrum slice, and determining the type-2 spectrum slice comprising the G1 consecutive frequency slots that are idle to be the target spectrum slice comprises, when any of the at least one type-A spectrum slices found in the N consecutive frequency slots comprises G1 consecutive frequency slots that are idle, determining the any of the at least one type-A spectrum slice to be the target spectrum slice.

2. The method according to claim 1, wherein type-2 spectrum slices of the optical-layer spectrum resource comprise at least one type-A spectrum slice and at least one type-B spectrum slice, and determining the type-2 spectrum slice comprising the G1 consecutive frequency slots that are idle to be the target spectrum slice comprises:
when any of the at least one type-A spectrum slices comprised in the N consecutive frequency slots comprises G1 consecutive frequency slots that are idle, determining the any type-A spectrum slice to be the target spectrum slice; or
when none of the at least one type-A spectrum slices comprised in the N consecutive frequency slots comprises G1 consecutive idle frequency slots, searching the N consecutive frequency slots for the at least one type-B spectrum slice, and in response to determining that the at least one type-B spectrum slice comprises G1 consecutive idle frequency slots, determining the at least one type-B spectrum slice to be the target spectrum slice.

3. The method according to claim 2, further comprising:
in response to none of the at least one type-B spectrum slices comprising G1 consecutive idle frequency slots, when N2 consecutive idle frequency slots are found in the N consecutive frequency slots, determining the N2 consecutive idle frequency slots to be the target spectrum slice.

4. The method according to claim 1, wherein
when none of the at least one type-A spectrum slices comprises G1 consecutive frequency slots that are idle, searching the N consecutive frequency slots for the at least one type-B spectrum slice, and when M1 type-B spectrum slices are determined, and M2 target type-B spectrum slices are determined in the M1 type-B spectrum slices, determining the target spectrum slice from the M2 target type-B spectrum slices based on spectrum occupation information of the M2 target type-B spectrum slices, wherein each of the M2 target type-B spectrum slices is a type-B spectrum slice comprising G1 consecutive idle frequency slots, and spectrum occupation information of any of the M2 target type-B spectrum slices represents occupation statuses of all frequency slots comprised in the respective target type-B spectrum slice on all of the L optical links.

5. The method according to claim 4, wherein the M2 target type-B spectrum slices comprise a first target type-B spectrum slice and a second target type-B spectrum slice, and determining the target spectrum slice from the M2 target type-B spectrum slices based on spectrum occupation information of the M2 target type-B spectrum slices comprises:
obtaining first spectrum occupation information corresponding to the first target type-B spectrum slice and second spectrum occupation information corresponding to the second target type-B spectrum slice;

calculating, based on the transmission bandwidth granularity G1 and the first spectrum occupation information, a first fragmentation rate corresponding to the first target type-B spectrum slice, and calculating, based on the transmission bandwidth granularity G1 and the second spectrum occupation information, a second fragmentation rate corresponding to the second target type-B spectrum slice, wherein each of the first fragmentation rate and the second fragmentation rate represent a quantity of spectrum fragments comprised in the corresponding target type-B spectrum slice; and performing the following:
    in response to determining that the first fragmentation rate is greater than or equal to the second fragmentation rate, determining the second target type-B spectrum slice to be the target spectrum slice; or
    in response to determining that the first fragmentation rate is less than the second fragmentation rate, determining the first target type-B spectrum slice to be the target spectrum slice.

6. The method according to claim 5, wherein calculating, based on the transmission bandwidth granularity G1 and the first spectrum occupation information, the first fragmentation rate corresponding to the first target type-B spectrum slice comprises:

calculating an average value of utilization of all frequency slots in the first target type-B spectrum slice on the L optical links based on the first spectrum occupation information; and performing the following:
    in response to the average value being greater than or equal to a preset average-value threshold, determining the first fragmentation rate to be null; or
    in response to the average value being less than the preset average-value threshold, counting a total fragment quantity of the first target type-B spectrum slice on the target fiber channel based on the first spectrum occupation information, and determining the first fragmentation rate by:
        in response to determining that a ratio of the total fragment quantity of the first target type-B spectrum slice on the target fiber channel to a quantity of frequency slots comprised in the first target type-B spectrum slice is greater than or equal to a preset ratio threshold, determining the ratio as the first fragmentation rate corresponding to the first target type-B spectrum slice; or
        in response to determining that the ratio is less than the preset ratio threshold, determining the first fragmentation rate to be null.

7. The method according to claim 6, wherein counting the total fragment quantity of the first target type-B spectrum slice on the target fiber channel based on the first spectrum occupation information comprises:

performing the following operations on the first target type-B spectrum slice on any optical link i in the L optical links in the target fiber channel based on the first spectrum occupation information:
    determining, based on an occupation status of the first target type-B spectrum slice on the optical link i that is comprised in the first spectrum occupation information, one or more frequency slot blocks that are in the first target type-B spectrum slice and that are not occupied by the optical link i;
    counting a quantity of target frequency slot blocks comprised in the one or more frequency slot blocks, and determining the quantity of target frequency slot blocks as a fragment quantity of the first target type-B spectrum slice on the optical link i, wherein a quantity of frequency slots comprised in the target frequency slot block is less than the transmission bandwidth granularity G1; and
    determining the total fragment quantity of the first target type-B spectrum slice on the target fiber channel based on fragment quantities of the first target type-B spectrum slice on the optical links.

8. The method according to claim 5, wherein calculating, based on the transmission bandwidth granularity G1 and the second spectrum occupation information, the second fragmentation rate corresponding to the second target type-B spectrum slice comprises:

calculating an average value of utilization of all frequency slots in the second target type-B spectrum slice on the L optical links based on the second spectrum occupation information; and performing the following:
    in response to the average value being greater than or equal to a preset average-value threshold, determining the second fragmentation rate to be null; or
    in response to the average value being less than the preset average-value threshold, counting a total fragment quantity of the second target type-B spectrum slice on the target fiber channel based on the second spectrum occupation information, and determining the second fragmentation rate by:
        in response to determining that a ratio of the total fragment quantity of the second target type-B spectrum slice on the target fiber channel to a quantity of frequency slots comprised in the second target type-B spectrum slice is greater than or equal to a preset ratio threshold, determining the ratio to be the second fragmentation rate corresponding to the second target type-B spectrum slice.

9. The method according to claim 8, wherein counting the total fragment quantity of the second target type-B spectrum slice on the target fiber channel based on the second spectrum occupation information comprises:

performing the following operations on the second target type-B spectrum slice on any optical link i in the optical links in the target fiber channel based on the second spectrum occupation information:
    determining, based on an occupation status of the second target type-B spectrum slice on the optical link i that is comprised in the second spectrum occupation information, one or more frequency slot blocks that are in the second target type-B spectrum slice and that are not occupied by the optical link i;
    counting a quantity of target frequency slot blocks comprised in the one or more frequency slot blocks, and determining the quantity of target frequency slot blocks as a fragment quantity of the second target type-B spectrum slice on the optical link i, wherein a quantity of frequency slots comprised in the target frequency slot block is less than the transmission bandwidth granularity G1; and
    determining the total fragment quantity of the second target type-B spectrum slice on the target fiber channel based on fragment quantities of the second target type-B spectrum slice on the optical links.

10. The method according to claim 8, wherein calculating, based on the transmission bandwidth granularity G1 and the second spectrum occupation information, the second fragmentation rate corresponding to the second target type-B spectrum slice comprises:
performing, in response to determining that the ratio is less than the preset ratio threshold, determining the second fragmentation rate to be null.

11. An apparatus, comprising:
a non-transitory memory storing instructions; and
a processor coupled to the non-transitory memory;
wherein the instructions are executable by the processor to cause the apparatus to be configured to:
obtain a transmission bandwidth granularity G1 of a target service and an optical-layer spectrum resource of a target fiber channel corresponding to the target service, wherein the optical-layer spectrum resource comprises N consecutive frequency slots, and each of the N consecutive frequency slots have a same spectrum bandwidth;
determine a target spectrum slice from the N consecutive frequency slots based on the transmission bandwidth granularity G1, wherein the target spectrum slice comprises Ni consecutive frequency slots, the target spectrum slice comprises at least G1 consecutive idle frequency slots, N is greater than Ni, and Ni is greater than or equal to G1;
allocate the G1 consecutive idle frequency slots comprised in the target spectrum slice to the target service;
in response to determining that the N consecutive frequency slots comprise a type-1 spectrum slice comprising G1 consecutive frequency slots that are idle, determine the type-1 spectrum slice comprising the G1 consecutive frequency slots that are idle to be the target spectrum slice, wherein a quantity N2 of frequency slots comprised in the type-1 spectrum slice is an integer multiple of the transmission bandwidth granularity G1; or
in response to determining that the N consecutive frequency slots do not comprise any type-1 spectrum slice comprising G1 consecutive frequency slots that are idle, search the N consecutive frequency slots for a type-2 spectrum slice, and in response to determining that the N consecutive frequency slots comprise a type-2 spectrum slice comprising G1 consecutive frequency slots that are idle, determine the type-2 spectrum slice comprising the G1 consecutive frequency slots that are idle to be the target spectrum slice, and wherein:
each type-2 spectrum slice comprises a type-A spectrum slice or a type-B spectrum slice;
a quantity N3 of frequency slots comprised in each type-B spectrum slice is an integer multiple of a transmission bandwidth granularity G2, and G2 is not equal to G1; and
a quantity of frequency slots comprised in each type-A spectrum slice is N2, or a quantity of frequency slots comprised in each type-A spectrum slices is N2 or N3; and
each type-A spectrum slice is occupied by at least two types of services with different transmission bandwidth granularities, wherein the target fiber channel comprises L optical links, and type-2 spectrum slices of the optical-layer spectrum resource comprise at least one type-A spectrum slice and at least one type-B spectrum slice, and the instructions are executable by the processor to cause the apparatus to be further configured to, when any of the at least one type-A spectrum slices found in the N consecutive frequency slots comprise G1 consecutive idle frequency slots, determine the any of the at least one type-A spectrum slice to be the target spectrum slice.

12. The apparatus according to claim 11, wherein the instructions are executable by the processor to cause the apparatus to be further configured to:
in response to determining that N2 consecutive frequency slots in the N consecutive frequency slots are idle, determine the N2 consecutive frequency slots that are idle to be the target spectrum slice, wherein N2 is an integer multiple of the transmission bandwidth granularity G1, and N2 is less than N.

13. The apparatus according to claim 12, wherein type-2 spectrum slices of the optical-layer spectrum resource comprise at least one type-A spectrum slice and at least one type-B spectrum slice, and the instructions are executable by the processor to cause the apparatus to be further configured to:
when any of the at least one type-A spectrum slice of the N consecutive frequency slots comprises G1 consecutive idle frequency slots, determine the any of the at least one type-A spectrum slice to be the target spectrum slice; or
when none of the at least one type-A spectrum slice comprises G1 consecutive idle frequency slots, search the N consecutive frequency slots for the at least one type-B spectrum slice, and in response to determining that the at least one type-B spectrum slice comprises G1 consecutive idle frequency slots, determine the at least one type-B spectrum slice to be the target spectrum slice.

14. The apparatus according to claim 13, wherein the instructions are executable by the processor to cause the apparatus to be further configured to:
in response to none of the at least one type-B spectrum slices comprising G1 consecutive idle frequency slots, when N2 consecutive idle frequency slots are found in the N consecutive frequency slots, determine the N2 consecutive idle frequency slots to be the target spectrum slice.

15. The apparatus according to claim 12, wherein the target fiber channel comprises L optical links, and type-2 spectrum slices of the optical-layer spectrum resource comprise at least one type-A spectrum slice and at least one type-B spectrum slice, and the instructions are executable by the processor to cause the apparatus to be further configured to:
when any of the at least one type-A spectrum slices found in the N consecutive frequency slots comprise G1 consecutive idle frequency slots, determine the any of the at least one type-A spectrum slice to be the target spectrum slice; or
when none of the at least one type-A spectrum slices comprises G1 consecutive idle frequency slots, search the N consecutive frequency slots for the at least one type-B spectrum slice, and when M1 type-B spectrum slices are determined, and M2 target type-B spectrum slices are determined in the M1 found type-B spectrum slices, determine the target spectrum slice from the M2 target type-B spectrum slices based on spectrum occupation information of the M2 target type-B spectrum slices, wherein each of the M2 target type-B spectrum slices is a type-B spectrum slice comprising G1 consecutive idle frequency slots, and spectrum occupation information of any of the M2 target type-B spectrum slices represents occupation statuses of all frequency slots comprised in the respective target type-B spectrum slice on all of the L optical links.

16. The apparatus according to claim 15, wherein the M2 target type-B spectrum slices comprise a first target type-B spectrum slice and a second target type-B spectrum slice, and the instructions are executable by the processor to cause the apparatus to be further configured to:
obtain first spectrum occupation information corresponding to the first target type-B spectrum slice and second spectrum occupation information corresponding to the second target type-B spectrum slice;
calculate, based on the transmission bandwidth granularity G1 and the first spectrum occupation information, a first fragmentation rate corresponding to the first target type-B spectrum slice, and calculate, based on the transmission bandwidth granularity G1 and the second spectrum occupation information, a second fragmentation rate corresponding to the second target type-B spectrum slice, wherein each of the first fragmentation rate and the second fragmentation rate represents a quantity of spectrum fragments comprised in the corresponding target type-B spectrum slice; and
perform the following:
in response to the first fragmentation rate being greater than or equal to the second fragmentation rate, determine the second target type-B spectrum slice to be the target spectrum slice.

17. The apparatus according to claim 16, wherein the instructions are executable by the processor to cause the apparatus to be further configured to:
calculate an average value of utilization of all frequency slots in the first target type-B spectrum slice on the optical links based on the first spectrum occupation information; and
performing the following:
in response to the average value being greater than or equal to a preset average-value threshold, determine the first fragmentation rate to be null; or
in response to the average value being less than the preset average-value threshold, count a total fragment quantity of the first target type-B spectrum slice on the target fiber channel based on the first spectrum occupation information, and determining the first fragmentation rate by:

in response to determining that a ratio of the total fragment quantity of the first target type-B spectrum slice on the target fiber channel to a quantity of frequency slots comprised in the first target type-B spectrum slice is greater than or equal to a preset ratio threshold, determine the ratio to be the first fragmentation rate corresponding to the first target type-B spectrum slice; or
in response to determining that the ratio is less than the preset ratio threshold, determine the first fragmentation rate to be null.

18. The apparatus according to claim 17, wherein the instructions are executable by the processor to cause the apparatus to be further configured to:
perform the following operations on the first target type-B spectrum slice on any optical link i in the optical links in the target fiber channel based on the first spectrum occupation information:
determining, based on an occupation status of the first target type-B spectrum slice on the optical link i that is comprised in the first spectrum occupation information, one or more frequency slot blocks that are in the first target type-B spectrum slice and that are not occupied by the optical link i;
counting a quantity of target frequency slot blocks comprised in the one or more frequency slot blocks, and determining the quantity of target frequency slot blocks as a fragment quantity of the first target type-B spectrum slice on the optical link i, wherein a quantity of frequency slots comprised in the target frequency slot block is less than the transmission bandwidth granularity G1; and
determining the total fragment quantity of the first target type-B spectrum slice on the target fiber channel based on fragment quantities of the first target type-B spectrum slice on the optical links.

19. The apparatus according to claim 16, wherein the instructions are executable by the processor to cause the apparatus to be further configured to perform:
in response to the first fragmentation rate being less than the second fragmentation rate, determine the first target type-B spectrum slice to be the target spectrum slice.

* * * * *

UNITED STATES PATENT AND TRADEMARK OFFICE
CERTIFICATE OF CORRECTION

PATENT NO. : 11,825,248 B2
APPLICATION NO. : 17/508432
DATED : November 21, 2023
INVENTOR(S) : Liu et al.

Page 1 of 1

It is certified that error appears in the above-identified patent and that said Letters Patent is hereby corrected as shown below:

In the Claims

In Column 31, in Claim 1, Line 26, delete "Ni" and insert -- N1 --.

In Column 31, in Claim 1, Line 28, delete "Ni, and Ni" and insert -- N1, and N1 --.

In Column 35, in Claim 11, Line 22, delete "Ni" and insert -- N1 --.

In Column 35, in Claim 11, Line 24, delete "Ni, and Ni" and insert -- N1, and N1 --.

Signed and Sealed this
Sixth Day of February, 2024

Katherine Kelly Vidal
*Director of the United States Patent and Trademark Office*